June 23, 1936.  A. F. HOWE  2,045,390

MACHINE FOR MAKING WOOD HEELS

Filed July 12, 1935  17 Sheets-Sheet 1

Inventor
Andrew F. Howe
by Ripley & Cassidy
His Attorneys

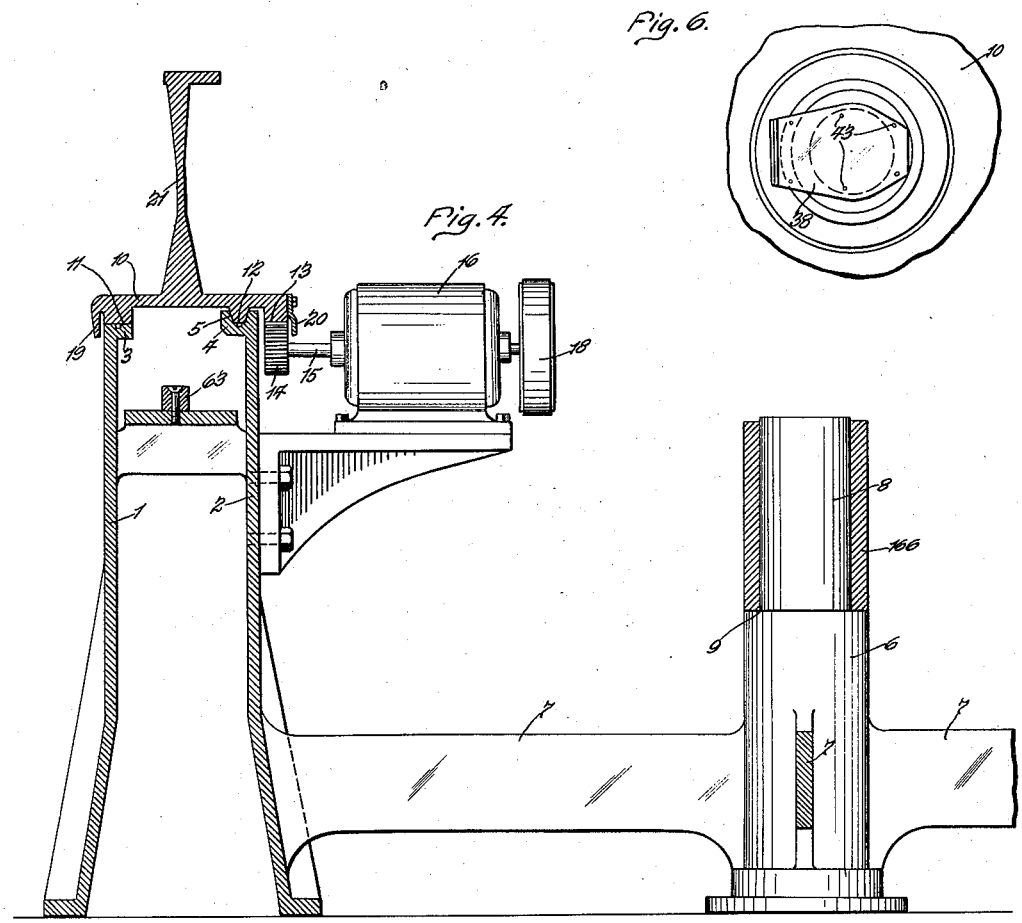

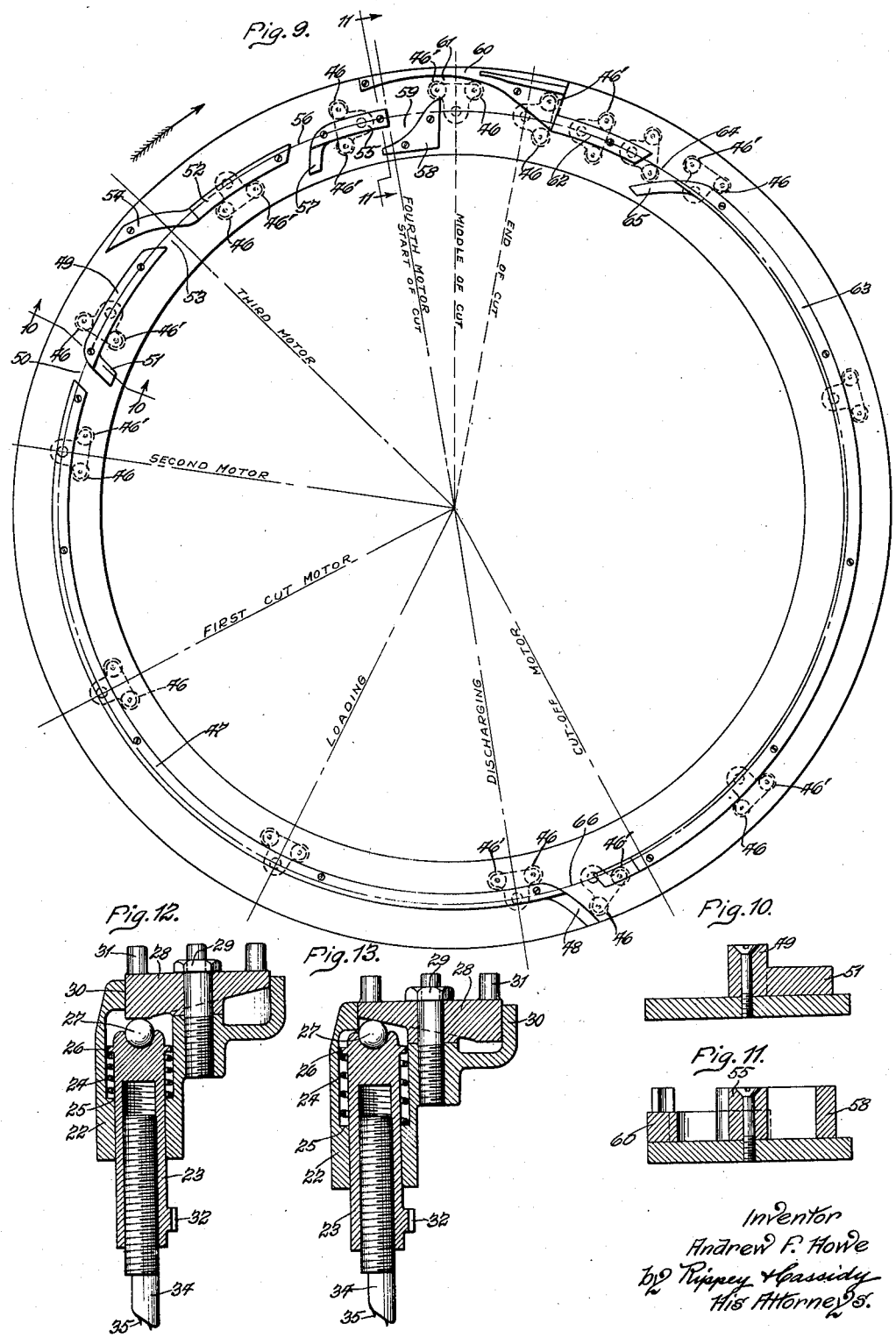

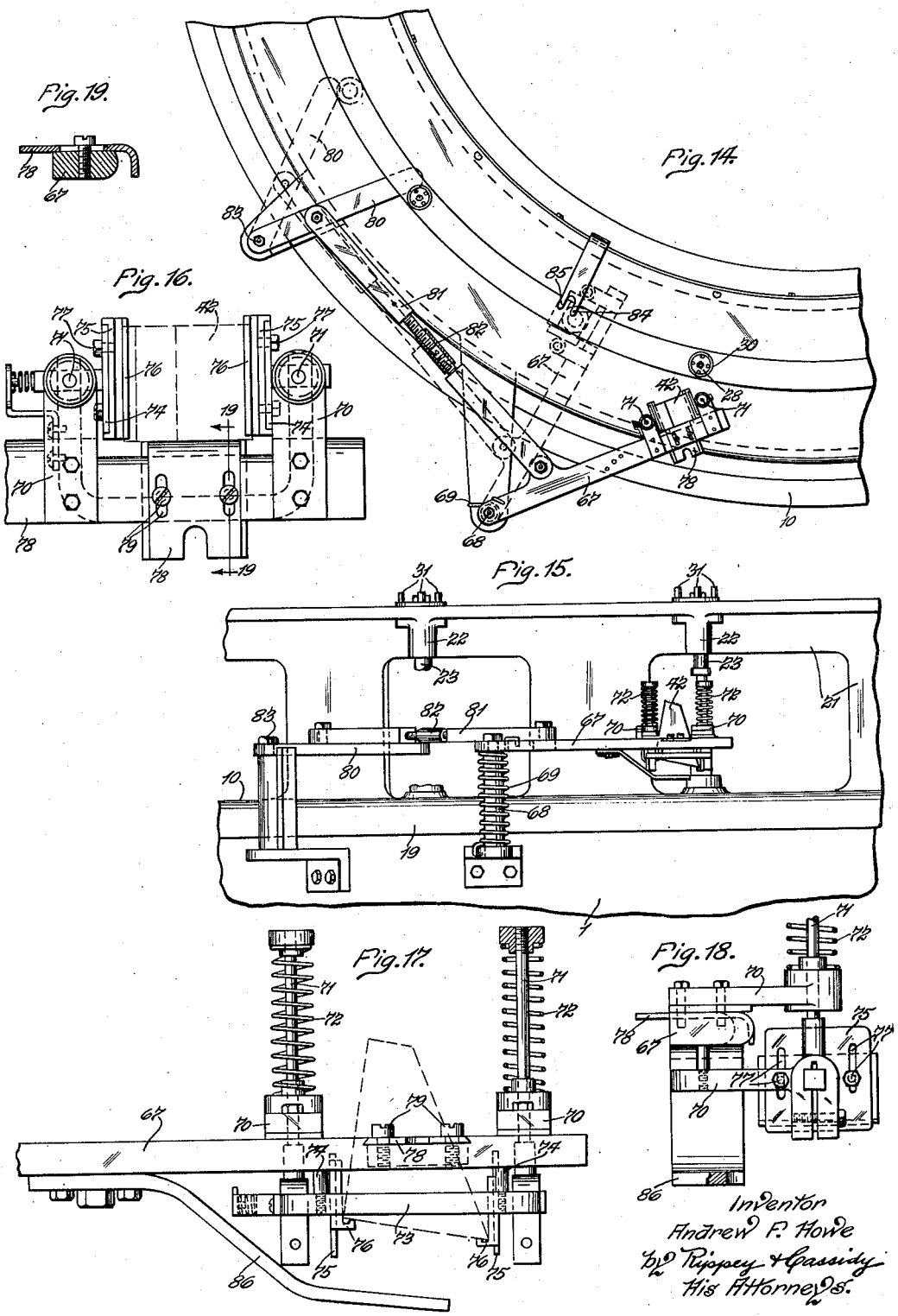

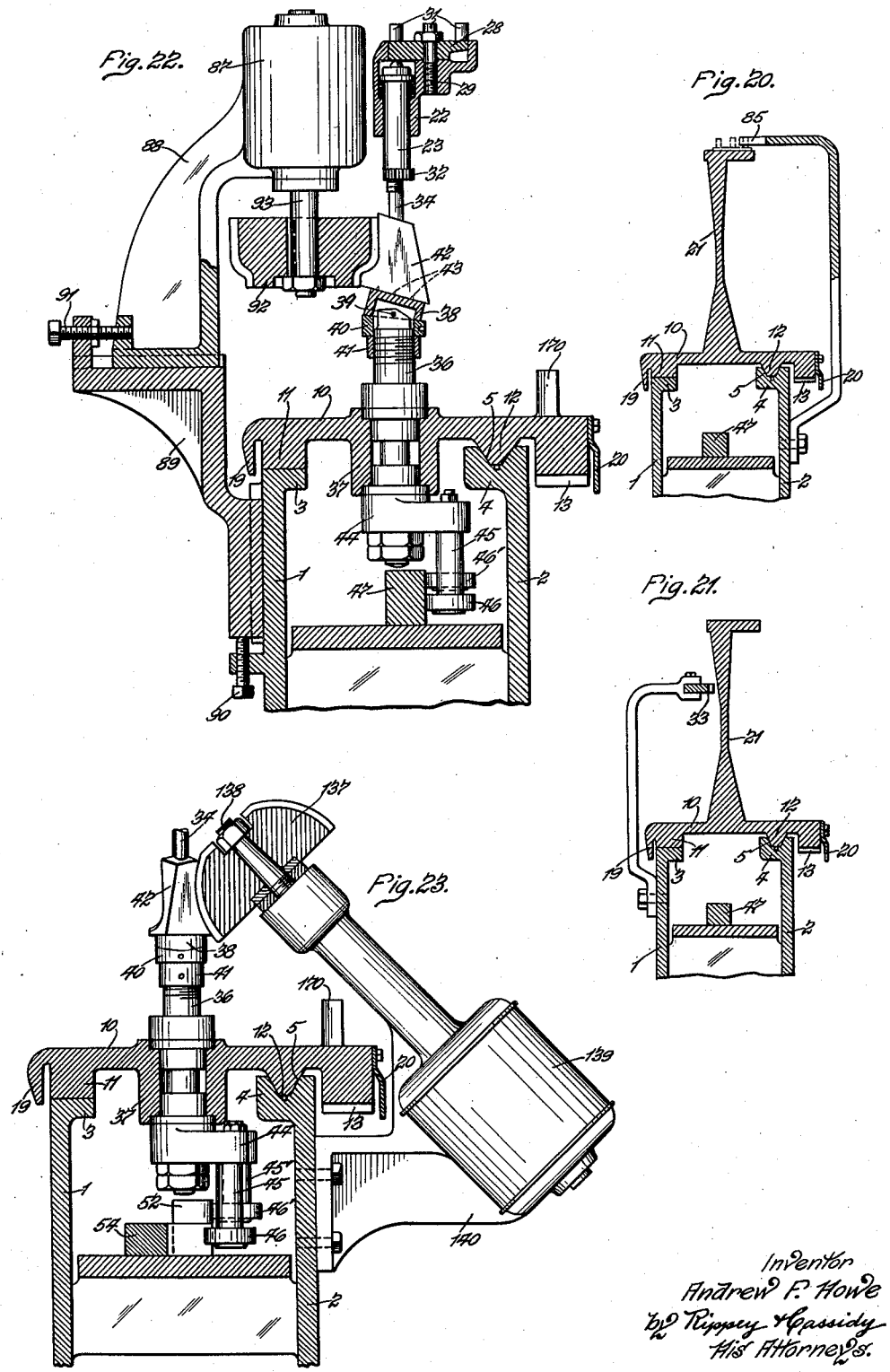

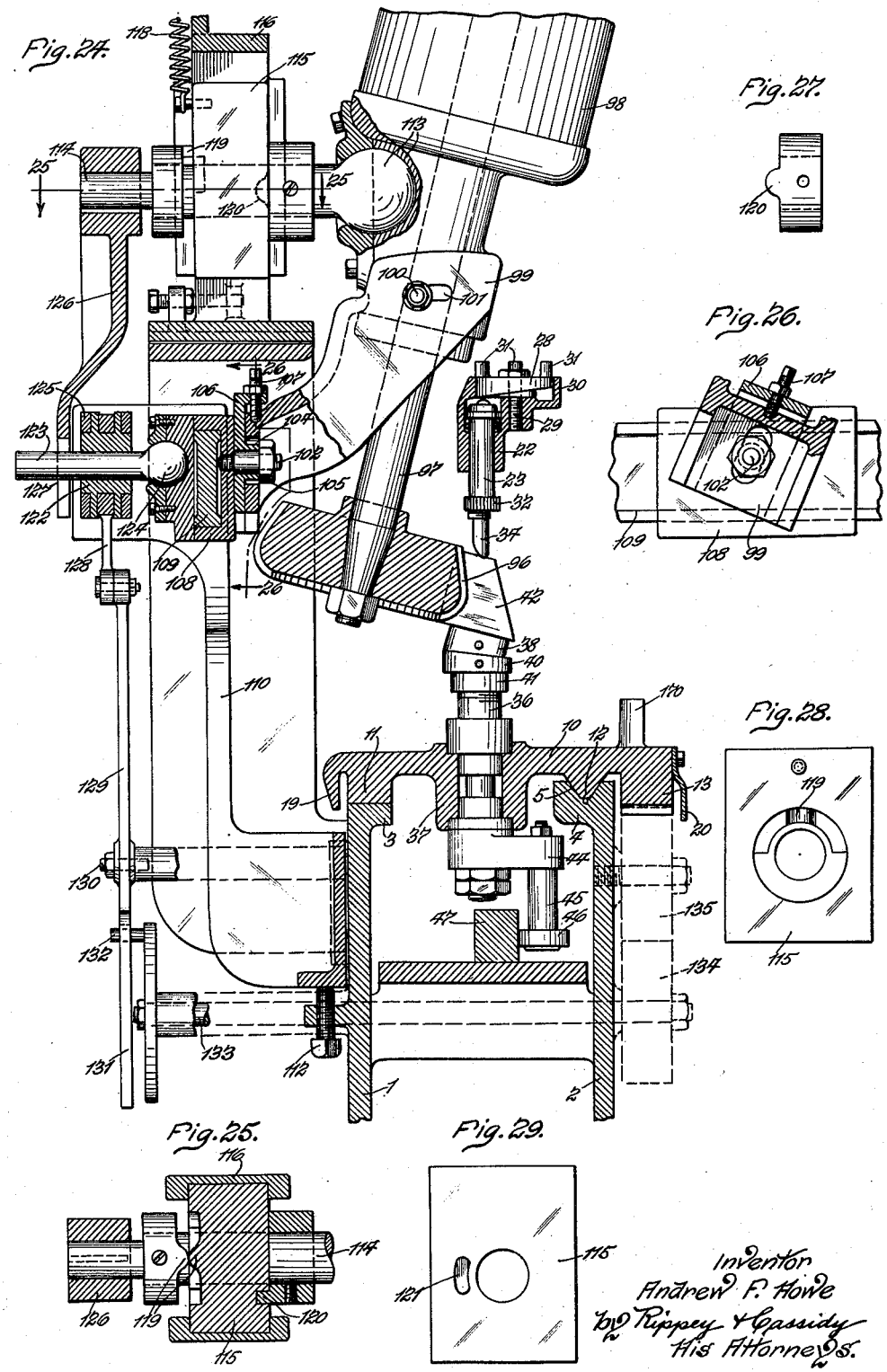

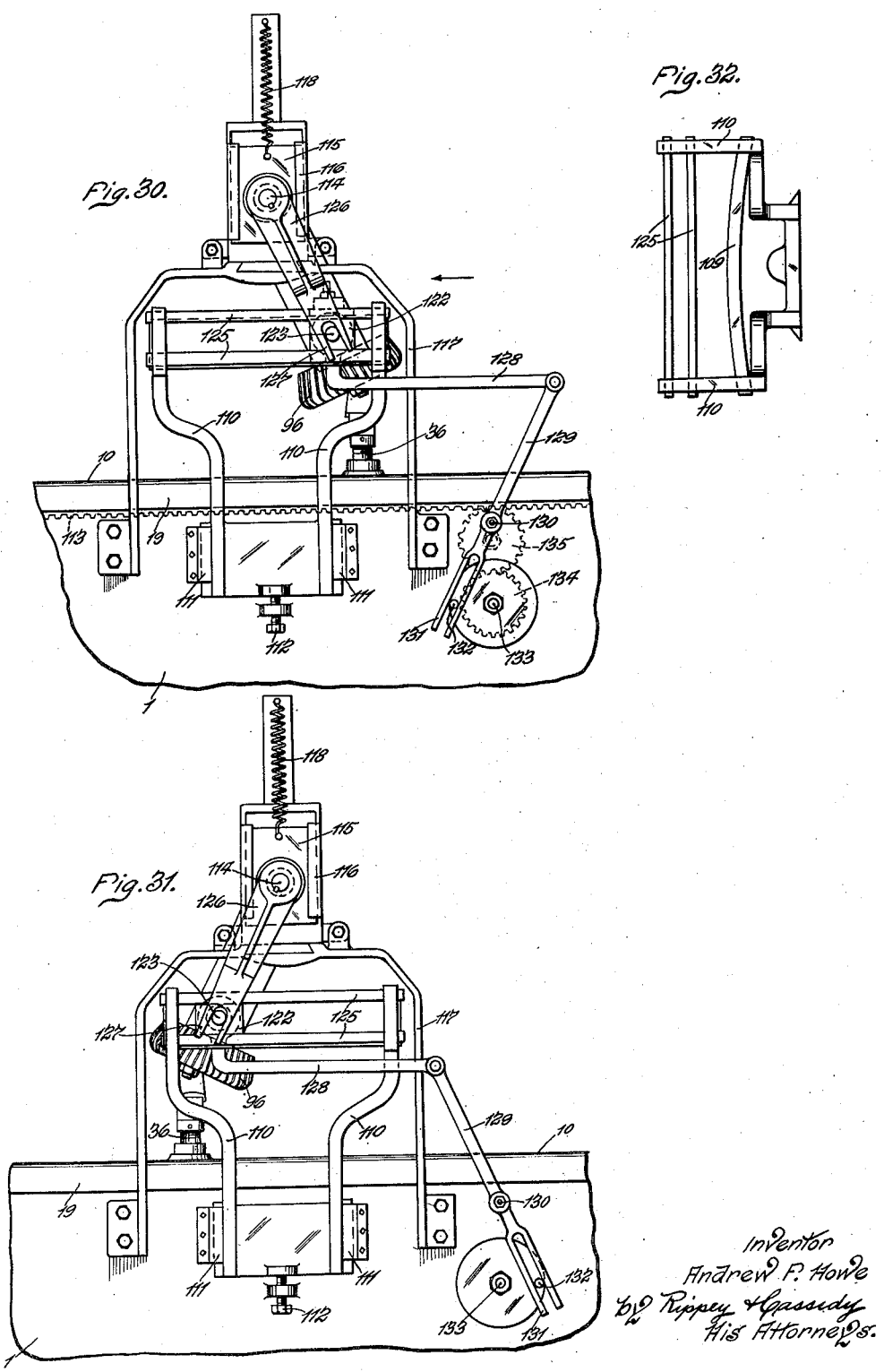

June 23, 1936.  A. F. HOWE  2,045,390
MACHINE FOR MAKING WOOD HEELS
Filed July 12, 1935   17 Sheets-Sheet 8
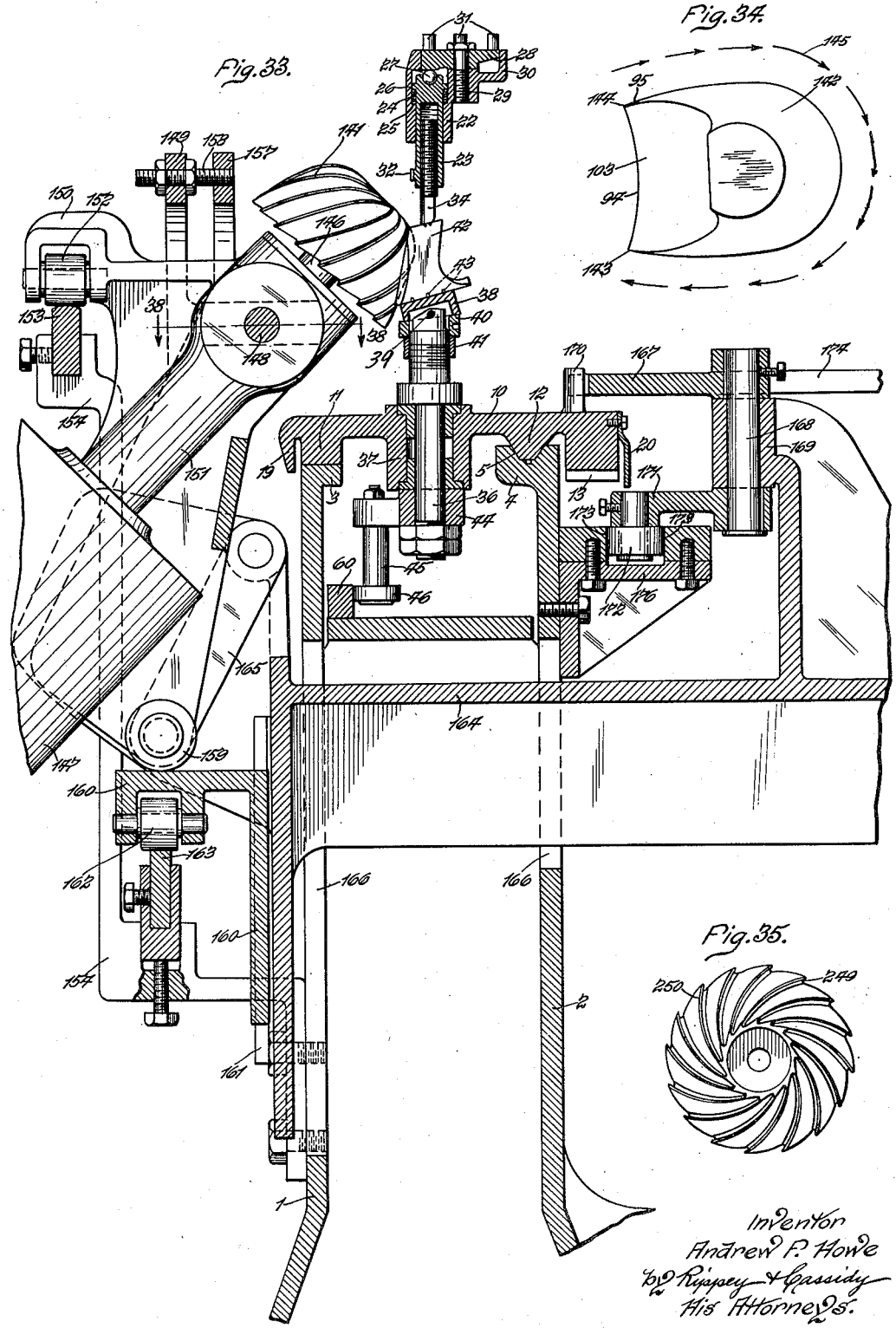
Inventor
Andrew F. Howe
by Rippey & Cassidy
His Attorneys

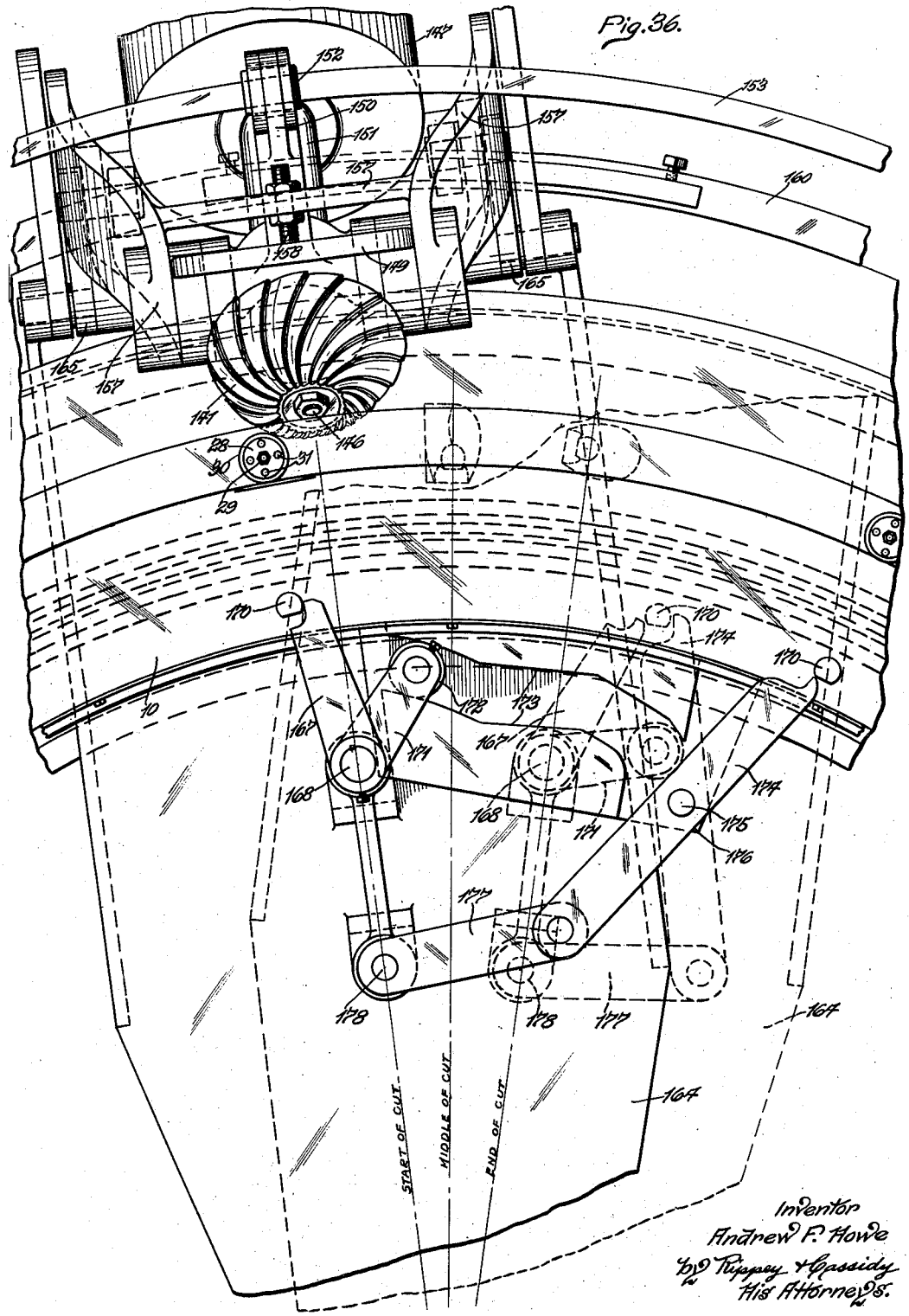

June 23, 1936.  A. F. HOWE  2,045,390
MACHINE FOR MAKING WOOD HEELS
Filed July 12, 1935  17 Sheets-Sheet 10
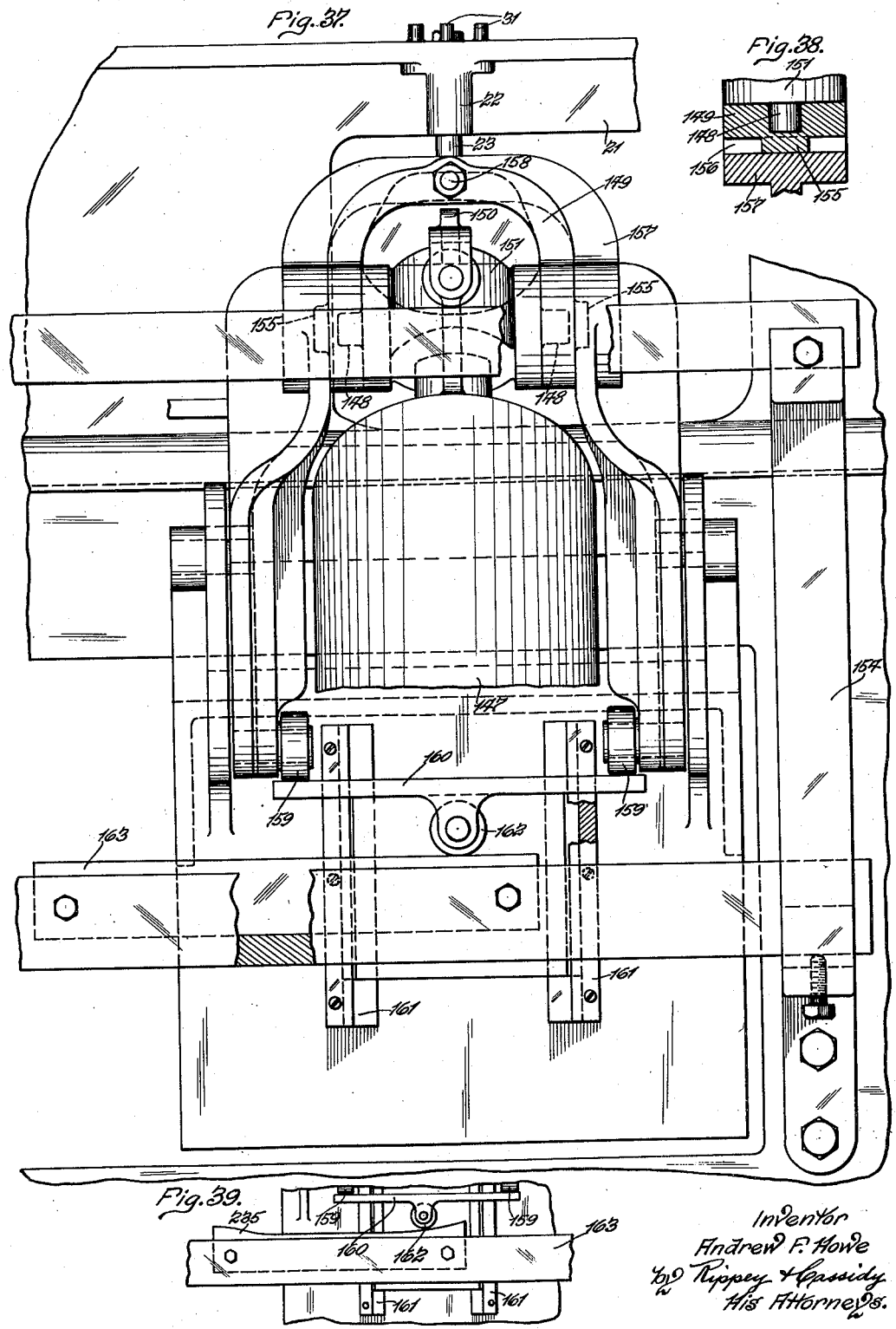
Inventor
Andrew F. Howe
by Rippey & Cassidy
His Attorneys June 23, 1936.  A. F. HOWE  2,045,390
MACHINE FOR MAKING WOOD HEELS
Filed July 12, 1935   17 Sheets-Sheet 11
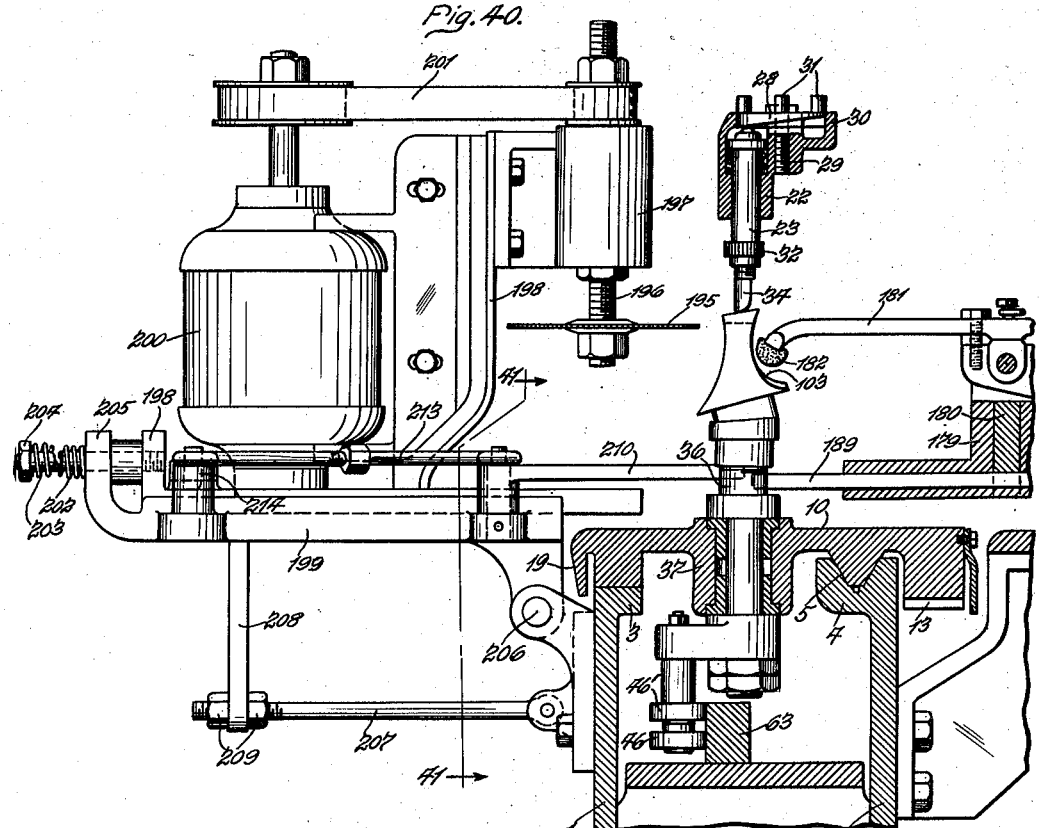
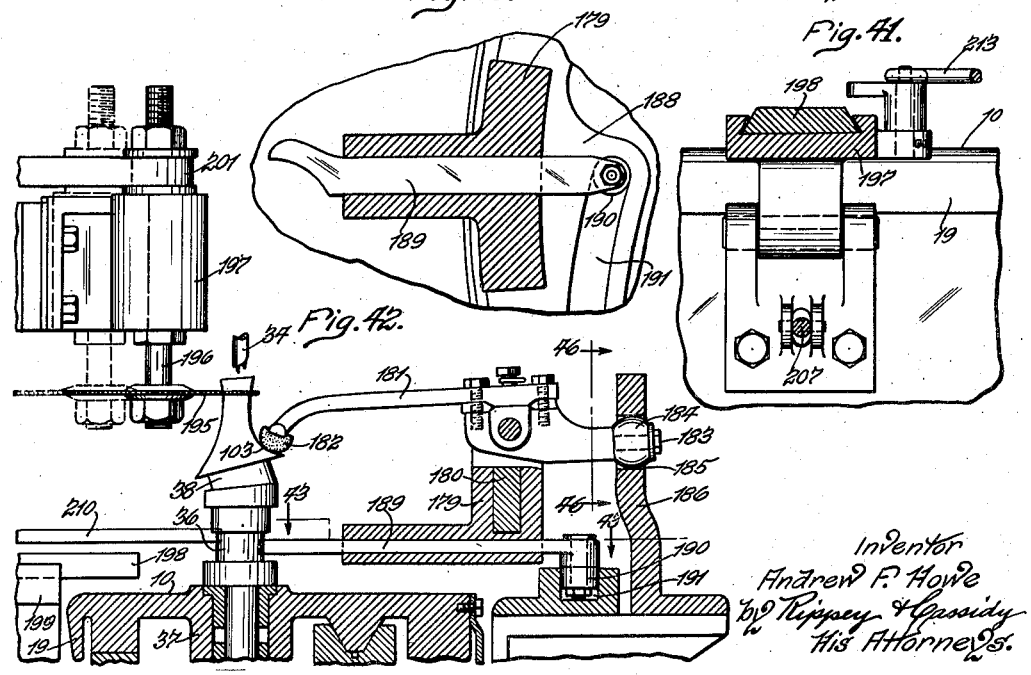

June 23, 1936.  A. F. HOWE  2,045,390
MACHINE FOR MAKING WOOD HEELS
Filed July 12, 1935  17 Sheets-Sheet 12

Inventor
Andrew F. Howe
by Rippey & Cassidy
His Attorneys

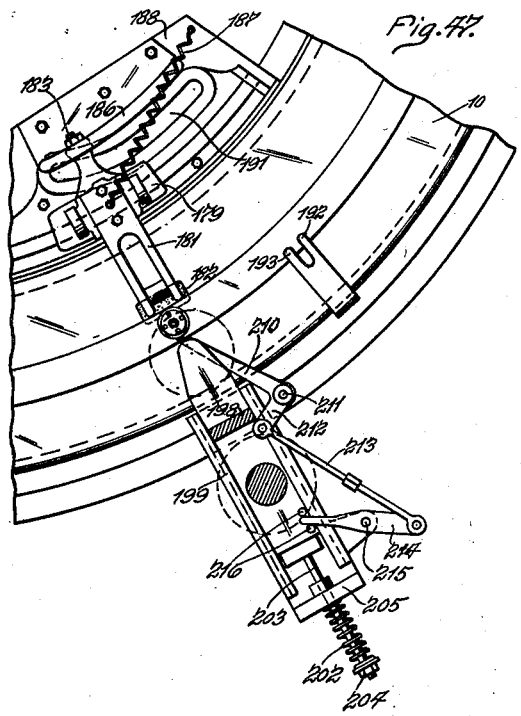
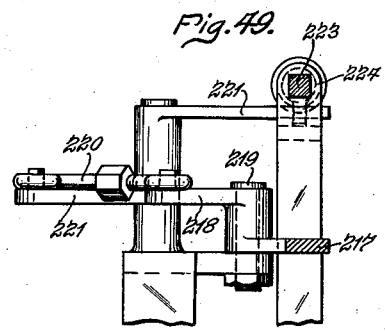
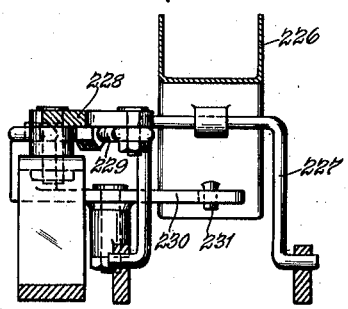
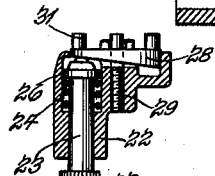
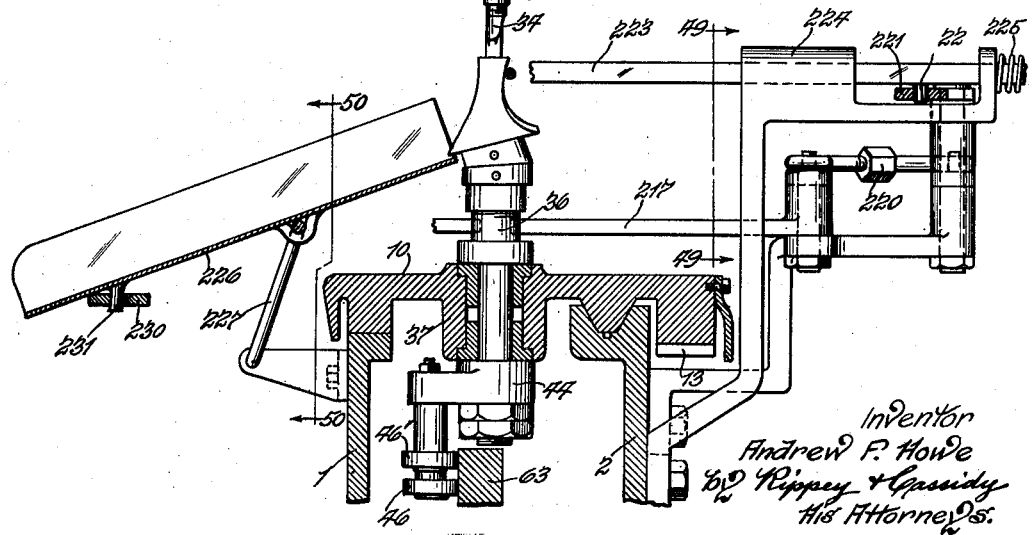

June 23, 1936.  A. F. HOWE  2,045,390
MACHINE FOR MAKING WOOD HEELS
Filed July 12, 1935  17 Sheets-Sheet 14
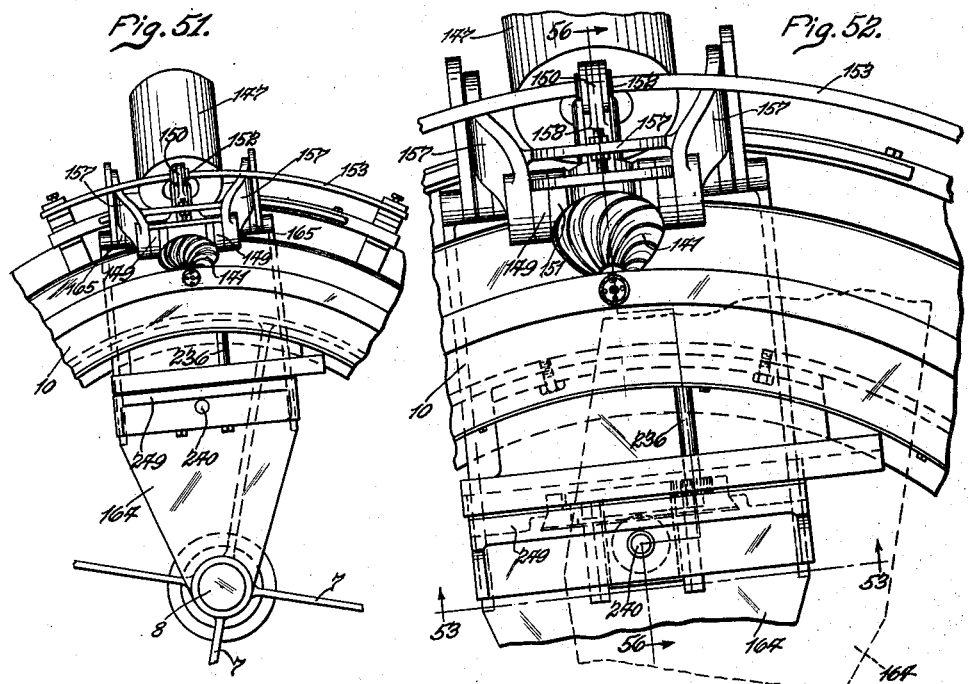
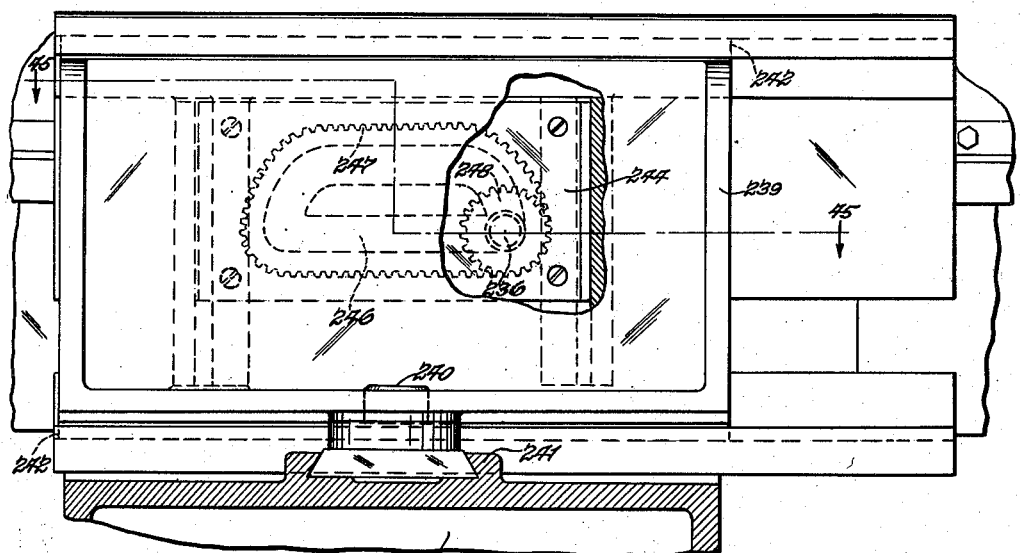
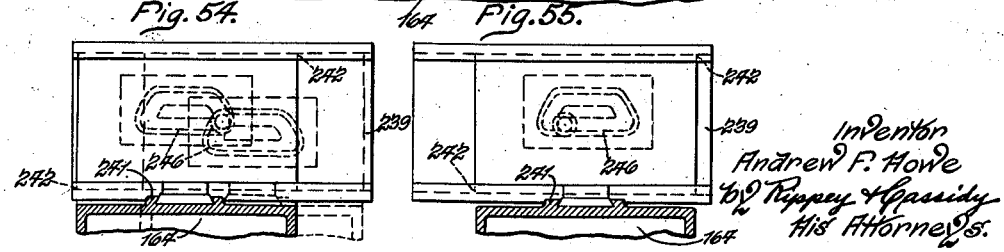

June 23, 1936.   A. F. HOWE   2,045,390

MACHINE FOR MAKING WOOD HEELS

Filed July 12, 1935   17 Sheets-Sheet 15

Inventor
Andrew F. Howe
by Rippey + Cassidy
His Attorneys.

June 23, 1936.　　　A. F. HOWE　　　2,045,390
MACHINE FOR MAKING WOOD HEELS
Filed July 12, 1935　　17 Sheets-Sheet 16
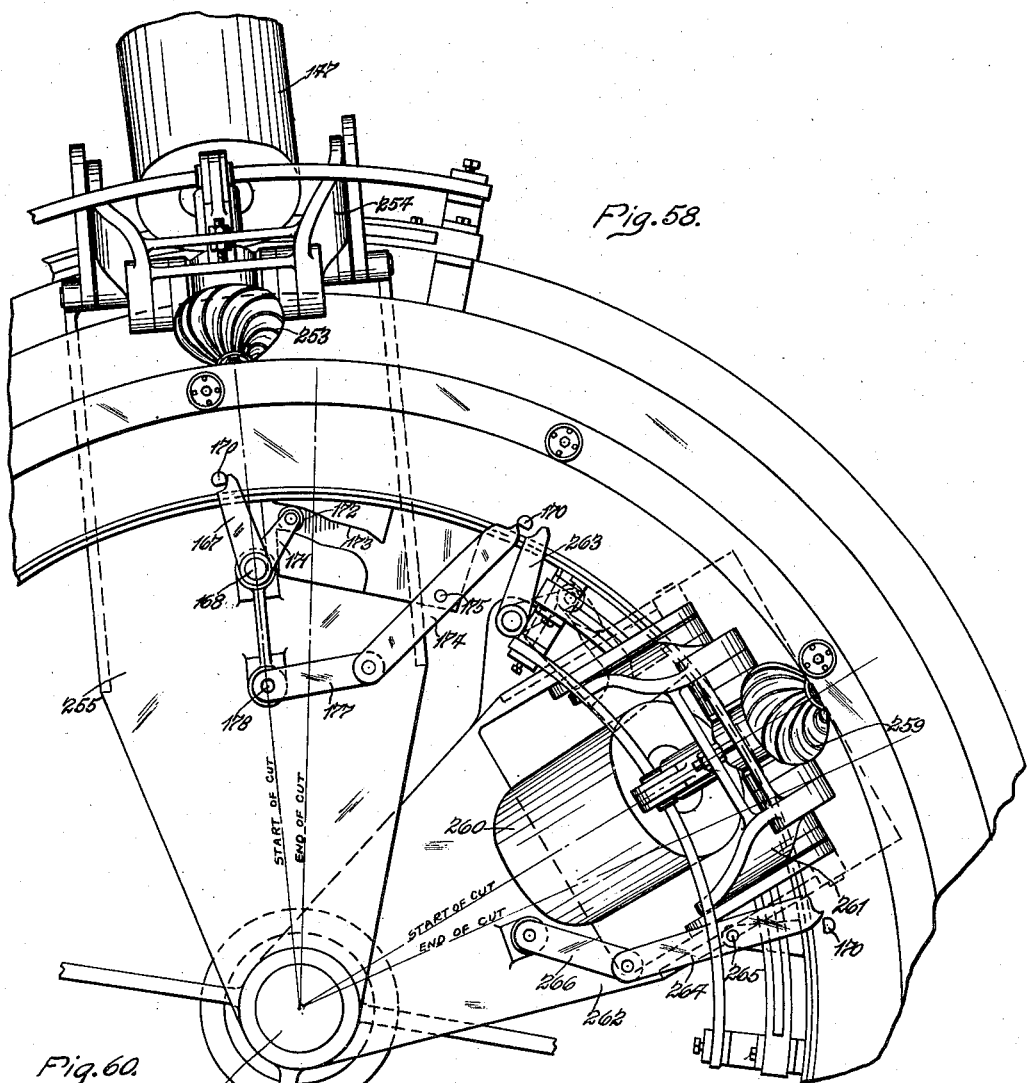
Inventor
Andrew F. Howe
by Roper & Cassidy
His Attorneys June 23, 1936. A. F. HOWE 2,045,390
MACHINE FOR MAKING WOOD HEELS
Filed July 12, 1935 17 Sheets-Sheet 17

Inventor
Andrew F. Howe
by Rippey & Cassidy
His Attorneys.

Patented June 23, 1936

2,045,390

UNITED STATES PATENT OFFICE 2,045,390

MACHINE FOR MAKING WOOD HEELS

Andrew F. Howe, University City, Mo., assignor to United Wood Heel Company, St. Louis, Mo., a corporation of Delaware Application July 12, 1935, Serial No. 31,031

51 Claims. (Cl. 12—42)

This invention relates to machines for making wood heels.

Objects of the invention are to provide a machine for making wood heels comprising a continuously rotating support mounted on a vertical axis and having jacks mounted thereon for supporting the blanks from which the heels are made; to provide a series of cutters that operate on the blank during continuous movement of the blanks to form all of the outer walls of the heel; to provide means for controlling and operating the cutters so that they will form smooth surfaces on all of the outer walls of the heel; to provide novel operating mechanisms in the machine and to coordinate said mechanisms in such a way that the heels are made with great rapidity and with a minimum amount of loss resulting from imperfect formation of the heel surfaces; and to provide improved means for mounting the heel blanks on the jacks and for discharging the finished heels from the jacks.

Various other objects and advantages of the invention will be apparent from the following description, reference being made to the annexed drawings, in which—

Fig. 4 is an enlarged sectional view on the line 4—4 of Fig. 1.

Fig. 5 is an enlarged side elevation with parts broken away showing the rotary support or carriage having the jacks mounted thereon.

Fig. 6 is a plan view of the lower portion of one of the jacks as seen from the line 6—6 of Fig. 5.

Fig. 7 is a sectional view on the line 7—7 of Fig. 5.

Fig. 8 is a sectional view on the line 8—8 of Fig. 5.

Fig. 9 is a plan view of the devices for operating the jacks to turn the blanks to present the different portions thereof to the cutters during continuous movement of the jacks.

Fig. 10 is a sectional view on the line 10—10 of Fig. 9.

Fig. 11 is a sectional view on the line 11—11 of Fig. 9.

Figs. 12 and 13 are enlarged sectional views of the upper end portion of one of the jacks, in gripping position in Fig. 12 and in released position in Fig. 13.

Fig. 14 is a detail view of the mechanism for placing the blanks in the jacks.

Fig. 15 is a side elevation of said mechanism for placing the heel blanks in the jacks.

Fig. 16 is an enlarged plan view of the blank carrier whereby the blanks are moved to position to be engaged by the jacks.

Fig. 17 is an enlarged side elevation of the blank carrier that is shown in Fig. 16, with parts in section.

Fig. 18 is a detail view showing the device for coordinating the operation of the blank placing mechanism with the jacks.

Fig. 19 is a detail sectional view on the line 19—19 of Fig. 16.

Figs. 20, 21, 22, 23 and 24 are enlarged sectional views on the respective corresponding sectional lines of Fig. 1.

Figs. 25 and 26 are sectional views on the correspondingly designated section lines of Fig. 24.

Fig. 27 is an elevation of a cam device for shifting one of the cutters as required to form the desired angular walls at the front of the heel.

Figs. 28 and 29 are elevations of a cam block that cooperates with a pair of cam devices like that shown in Fig. 27.

Figs. 30 and 31 are side elevations showing the mechanism for swinging one of the cutters in coordinated relationship to the moving blank upon which the cutter operates.

Fig. 32 is a plan view of one of the frames cooperating with the swinging cutter.

Fig. 33 is an enlarged sectional view on the line 33—33 of Fig. 1.

Fig. 34 shows in plan the lower end of a wood heel formed by this machine, the arrows indicating the continuous turning movement of the heel blank during continuous operation thereon of the cutter from one side of the breast wall to the opposite side of the breast wall.

Fig. 35 shows one of the solid unitary cutters.

Fig. 36 is an enlarged plan view of the mechanism shown in Fig. 33.

Fig. 37 is an enlarged outer side elevation of the mechanism shown in Fig. 36.

Fig. 38 is a view showing one of the pivotal supporting members for the cutter and motor illustrated in Fig. 36.

Fig. 39 is an elevation of a portion of the carriage and cam structure supporting the motor and cutter for forming the outer walls of the heel.

Fig. 40 is an enlarged sectional view on the line 40—40 of Fig. 1.

Fig. 41 is a sectional view on the line 41—41 of Fig. 40.

Fig. 42 is a view showing a part of the mechanism that is shown in Fig. 40, which mechanism cuts off the lower end portion of the heel and discharges the heel from the jack.

Fig. 43 is a sectional view on the line 43—43 of Fig. 42.

Fig. 47 is a plan view of another part of the mechanism that is shown in Fig. 44 in a different operated position.

Fig. 48 is an enlarged sectional view on the line 48—48 of Fig. 1.

Figs. 49 and 50 are sectional views on the correspondingly designated section lines of Fig. 48.

Figs. 51 and 52 are plan views of modifications of the mechanism shown in Fig. 36.

Fig. 53 is a sectional view on the line 53—53 of Fig. 52.

Figs. 54 and 55 are detail views of a diagrammatic nature showing the shifting movements of the device controlling the cutter forming the outer walls of the heel.

Fig. 58 is a plan view of a portion of the machine modified to provide two cutters for forming the outer wall of the heel.

Fig. 59 is a plan view of the devices for operating the jacks to turn the blanks to present the different portions thereof to the two cutters for forming the outer wall of the heel.

Fig. 60 is an end elevation of the heel blank after one of the cutters has operated thereon to form approximately one-half of the outer wall of the heel.

Fig. 61 is an end elevation of the completed heel after the outer wall has been formed by the two cutters shown in Fig. 58.

Figure 1:
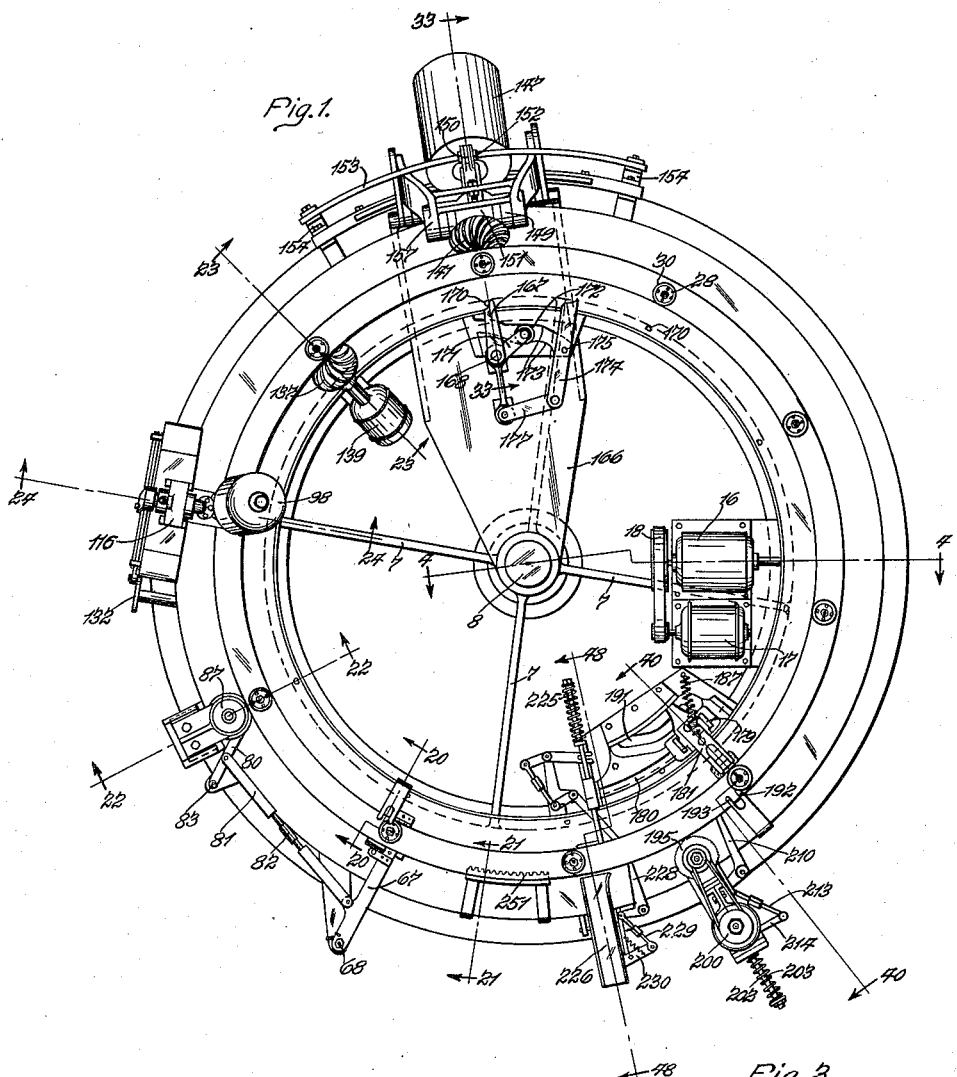
Fig. 1 is a plan view of my improved machine for making wood heels.
Figure 2:
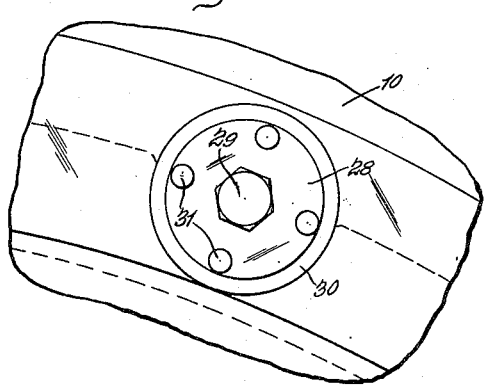
Fig. 2 is a view showing the upper end of one of the improved jacks for holding the blanks.

The machine comprises a rigid annular frame including two spaced annular concentric members 1 and 2 (Figs. 4, 22, 23 and 24). The outer member 1 is formed with a supporting rail 3 on its upper end and the inner member 2 is formed with a supporting rail 4 on its upper end. An annular groove 5 is formed in the upper side of the rail 4. An axial member 6 is integrally connected with the member 1 by webs 7 and is formed with a reduced upper end portion 8. A circumferential shoulder 9 is provided at the connection of the parts 6 and 8.

An annular carriage 10 has a flange 11 seated on the rail 3 and a flange 12 engaging in the groove 5. The flange 12 engaging in the groove 5 constitutes means for guiding and preventing displacement of the carriage 10 when said carriage is rotated in a horizontal plane and about a vertical axis. The carriage 10 is formed with an annular rack 13 meshing with a pinion 14 attached to a shaft 15 rotated by a conventional speed reducer mechanism 16. An electric motor 17 drives the speed reducer mechanism 16 by an appropriate driving connection 18 (Fig. 1). The outer periphery of the carriage 10 is formed with a dependent flange or apron 19 preventing wood particles or other foreign substances from passing between the carriage 10 and the rail 3. The inner periphery of the carriage 10 supports a dependent apron 20 for preventing foreign substances from becoming lodged on the pinion 14 or in the rack 13. An upwardly extended web 21 is formed integral or rigid with the carriage 10 and supports a series of vertical bearings 22 (Figs. 12 and 15) in each of which a sleeve 23 is supported for turning and vertical sliding movements. The sleeve 23 in each bearing is supported by a spring 24 encircling the upper end of the sleeve in the bearing and having its lower end seating upon a shoulder 25 and its upper end engaging the under surface of a circumferential flange 26 integral with the sleeve (Figs. 12 and 13).

An anti-friction device comprising a ball 27 is seated in the upper end of the sleeve 23 and is engaged by the under surface of a cam 28 rotatively mounted on an axle member 29 supported at the side of the bearing 22. The cam 28 is further guided and retained by a bearing construction 30 within which the cam is rotative. Four upwardly extended lugs 31 are integral with each cam 28 and constitute means for rotating the respective cams during rotation of the carriage 10 in order to push the sleeve 23 downwardly in opposition to the spring 24, or to permit the spring 24 to raise the sleeve 23, depending upon the position of the cam with respect to the ball 27 (Figs. 12 and 13). Each sleeve 23 rigidly supports a circumferential rack 32 (Figs. 8 and 12) which, just before a blank is placed in the jack, engages an arcuate rack 33 (Figs. 1 and 21), and thereby turns the sleeve 23 to proper position for a blank to be placed in the jack, one member 34 of which is supported by each sleeve 23. The jack members 34 are screwed into the sleeves 23 and it is, therefore, possible to place the jack members 34 in any required adjustment. The beveled lower ends of the jack members 34 have projecting teeth 35 to engage in the end of the blank.

The lower portion of each jack comprises a rod 36 (Figs. 22 and 33) rotatively supported in a vertical bearing 37 on the carriage 10. A support 38 is connected with the upper end of the rod 36 by a pivot 39 and seats on a cam 40 which holds the support 38 in an inclined position. The cam 40 is mounted on a supporting nut 41. The rod 36 is rotative in the bearing in which it is mounted, but is incapable of longitudinal movement. A blank 42 from which a wood heel is to be formed is mounted on the inclined support 38 and its upper end is rigidly engaged by the jack member 34. Projections 43 on the support 38 cooperate with the teeth 35 to hold the blank from turning with respect to the jack elements during operation of the cutters. A crank arm 44 is rigidly attached to the lower end of each jack rod 36 and supports a pair of depending arms 45 and 45' of different lengths having thereon rollers 46 and 46', respectively, for operation against an annular series of cams. These cams comprise the cam 47 having on one end an outwardly inclined arm 48; a cam 49 separated from the cam 47 by an intervening space 50 and having an inwardly inclined arm 51 at said space 50; a cam 52 separated from the cam 49 by a space 53 and having an outwardly inclined arm 54 at said space 53; a cam 55 separated from the cam 52 by a space 56 and having an inwardly inclined arm 57 at said space 56; a cam 58 separated from the cam 55 by a space 59; and a cam 60 separated from the cam 58 by a space 61 and having an arcuate extension 62 separated from a cam 63 by a space 64, said cam 63 having an inclined arm 65 at said space 64. The cam 63 is separated from the cam 47 and the arm 48 by a space 66. The rollers 46 operate against these cams and pass through the spaces separating said cams, and the successive positions of the rollers against the cams are graphically illustrated in Fig. 9. The operation of the rollers against the cams turns the rod 36 and thereby turns the blank 42 to present different portions and surfaces of said blank to the different cutters, as required to form a finished wood heel.

The blanks 42 are placed in the jacks by a carrier device. The carrier device includes an arm 67 (Figs. 1 and 14) mounted on a pivot 68 and swung outwardly by a spring 69. The inner end of the arm 67 supports a pair of inwardly extended brackets 70. A rod 71 is mounted for vertical sliding movements in each bracket 70 and is supported by a spring 72 (Fig. 17). The The lower ends of the rods 71 below the arm 67 are connected by a yoke 73 having pins 74 attached thereto and adapted to abut against the underside of the arm 67 and limit upward movement of the rods 71 by the springs 72. A plate 75 is supported by the lower end of each rod 71, and said plates support the angular blank holders 76 by means of pin and slot construction 77 which permit the blank holders 76 to be relatively adjusted. A gage 78 is adjustably attached to the arm 67 by screw and slot arrangement 79, permitting the gage to be placed in selected adjustments, as required to gage blanks of different sizes. The blanks placed upon the holders 76 are against the inner end of the gage 78, as should be understood by reference to Fig. 16.

The arm 67 is connected with an operating lever 80 by a link 81 which includes a turnbuckle device 82 for varying the length thereof. The lever 80 is mounted on a pivot 83 and extends inwardly to position to be engaged by one of the jack rods 36 (Fig. 14) and operated thereby to swing the arm 67 inwardly and place the blank 42 upon the support 38 of the next adjacent jack. Since the carriage 10 is constantly rotating, the arm 67 swings with the jack upon which the blank is to be placed and holds the blank above the support 38 until the jack member 34 is forced downwardly into clamping engagement with the blank. During movement of the jack, one of the pins 31 engages an arm 84 and turns the cam 28 one-quarter of a revolution, and another of the pins 31 engages another arm 85 and turns the cam 28 an additional one-quarter of a revolution, making one-half of a revolution of the cam 28 and bringing the high point of said cam against the ball 27. This pushes the jack member 34 into firm clamping engagement with the upper end of the blank 42. The arm 67 has attached to the underside thereof an arm 86 (Figs. 17 and 18) which will strike against the rear side of the jack rod 36 and prevent the arm 67 from swinging beyond the jack upon which the blank is being placed. After the blank is placed on the jack, the jack that had engaged the lever 80 passes beyond and releases said lever 80 (Fig. 14) and permits the spring 69 to swing the arm 67 outwardly to its unoperated or starting position.

A motor 87 is supported upon a bracket comprising an upper member 88 and a lower member 89 (Fig. 22). The bracket 89 is supported by the frame member 1 for vertical adjustments by means of a supporting screw 90, and the bracket member 88 is supported on the bracket 89 for inward and outward adjustments by a screw 91. A rotary cutter head 92 is attached to and rotated at high speed by the motor shaft 93 and functions to cut the arcuate wall 94 (Fig. 34) at the end of the forward extension 95 of the heel, and also to remove a portion of the heel blank at the front of the heel preparatory for the formation of the breast wall of the heel. During the time that the blank is being placed in the jack and during the time that the cutter 92 is operating on the heel blank, the jack rollers 46 operate against the inner surface of the cam 47.

The blank is next carried to and operated upon by a cutter 96 (Figs. 1 and 24) attached to the shaft 97 of a motor 98. The shaft 97 inclines upwardly and inwardly. The frame of the motor 98 is supported in a bracket 99 by clamp devices 100 extending through inclined slots 101 in the bracket 99. The bracket 99 is pivotally supported by a pivot 102 which is the center of the radius of the curvature of the curved wall 103 formed on the underside of the forwardly extended portion of the upper end of the heel (Fig. 34). The bracket 99 has a vertical slot 104 receiving the hub 105 of a plate 106 mounted for turning movements on the pivot 102. A supporting screw 107 is carried by the plate 106 and screws into the bracket 99, and thereby supports said bracket in any of its vertically adjusted positions to permit variation in the radius of curvature of the wall 103. The pivot 102 is attached to a carriage 108 mounted for sliding movements along a curved support 109 forming part of a frame 110. The frame member 110 is supported by the frame member 1 by means of brackets 111 (Figs. 30 and 31) and an adjustable supporting screw 112. The frame of the motor 98 is connected by a universal pivot 113 with a shaft 114 mounted for turning and longitudinal sliding movements in a block 115. The block 115 is supported for vertical sliding movements in a frame 116 mounted on a frame 117 attached to the member 1. The block 115 is supported, or partially supported, by a spring 118. When the shaft 114 is turned from one position to another, it is moved outwardly, thereby varying the inclination of the motor 98 and the shaft 97, by cam members 119, and is then moved inwardly by a cam member 120 moving out of a groove 121 in the block 115.

The carriage 108 is connected with a crosshead 122 by a rod 123 having pivot connection 124 with the carriage 108. The crosshead 122 is mounted between and supported by rails 125 forming part of the frame 110. An arm 126 has a fork 127 engaging the rod 123. A link 128 has one end pivoted to the crosshead 122 and the opposite end pivoted to a lever 129 mounted on a pivot 130 and having a fork 131 engaging a crank member 132 attached to a shaft 133 (Figs. 24, 30 and 31). The shaft 133 is rotatively supported by the frame members 1 and 2 and has on its inner end a gear 134 meshing with a gear 135 engaged and rotated by the rack 13. Thus, by the continuous rotation of the carriage 10, the carriage 108 is reciprocated along the curved support 109 which has the radius of curvature of the carriage 10. The shaft 114 is rocked and is moved inwardly and outwardly to vary the angle of inclination of the cutter head 96, which also swings about the pivot 102, as required to form the breast wall 136 of the heel and also the downwardly curved under wall 103 of the forward extension 95 at the upper end of the heel.

The roller 46' is on the arm 45' which is shorter than the arm 45 (Figs. 22 and 23). After leaving the cam 47, the roller 46' passes over the cam arm 51 and the roller 46 engages said cam arm and is thereby caused to pass through the space 50 to the outer side of the cam 49 while the roller 46' operates against the inner side of said cam 49 (Fig. 9). About the time that the roller 46 leaves the cam 49, said roller 46 engages the outwardly extended cam arm 54 and thereby rotates the jack members 34 and 36 and the blank 42 supported thereby. The blank is rotated during the time that the roller 46 advances through the space 53 to the inner side of the cam 52. By this turning movement of the jack members, the roller 46' is advanced in front of the roller 46 against the inner surface of the cam 52. During this turning movement, one of the inclined corners of the blank 42 is operated upon by a cutter 137 (Figs. 1 and 23) attached to a shaft 138 rotated by a motor 139 on a rigid support 140. The cutter 137 performs a rough cutting operation and removes something less than one-half of that portion of the block which must be cut away or removed to form the finished outer wall of the heel.

After leaving the cam 52, the roller 46" passes over the cam arm 57 and the roller 46 engages said cam arm 57 and is thereby caused to pass through the space 56 to the outer side of the cam 55. The jack and the blank therein are then rotated by the cams 58 and 60 during operation of the finishing cutter 141 (Figs. 1 and 33) which forms the finished outer wall 142 of the heel by cutting from the corner 143 around the entire outer portion of the blank to the opposite corner 144 (Fig. 34). During this operation the cams 58 and 60 turn the heel blank in the direction of the arrows 145. Also, during this operation, the cutter 141 is moving along with the heel blank and does not remain in a fixed location, as do the cutters 92 and 137.

The cutter 141 is attached to the motor shaft 146 rotated by a motor 147 mounted for slight swinging movements on a pivot 148 supported by a frame 149. An arm 150 is integral with the motor frame 151 and is supported by a roller 152 operating along a rail 153. The rail 153 is supported by a frame 154 rigid with the outer frame member 1. The frame 149 has projections 155 (Figs. 37 and 38) seated in grooves 156 in a frame 157. The frame 149 is attached to the frame 157 by a bolt 158 whereby said frames 149 and 157 are held in rigid relationship. The frame 157 is supported by rollers 159 seating on a support 160. The support 160 is adjustable vertically in guides 161 and is supported by a roller 162 operating on a rail 163 supported by the rigid frame 154. The frame 157 is connected with a swinging supporting member 164 by links 165. The supporting member 164 extends through openings 166 in the frame members 1 and 2 (Fig. 33) and is pivoted on the frame part 8 and supported on the shoulder 9 (Figs. 1 and 4). The supporting member 164 is for the purpose of moving the motor 147 and the cutter 141 along and in accompaniment with the blank 42 that is being operated on by the cutter during the turning of the blank by the cams 58 and 60.

A lever 167 (Figs. 1, 33 and 36) is attached to a short shaft 168 supported for turning movements in a bearing 169 on the support 164 and extends outwardly over the inner marginal portion of the carriage 10 in position to be engaged by lugs 170 rigid or integral with and projecting upwardly from the carriage 10. One of these lugs 170 is provided for each jack. A lever 171 is attached to the lower end of the shaft 168 and carries on its outer end a roller 172 operating between spaced cams 173. A lever 174 is mounted on a pivot 175 attached to the rigid support 176 on which the cams 173 are located. The outer end of the lever 174 extends over the inner marginal portion of the carriage 10 in position to be engaged by the respective lugs 170. The inner end of the lever 174 is pivoted to one end of a link 177 the opposite end of which link is mounted on a pivot 178 attached to the supporting member 164.

During the time that the cutter 141 is operating on the heel blank 42, and during the time that the heel blank 42 is being turned for operation of the cutter, said cutter is moved along with the heel blank. Such movement is caused by the lug 170 corresponding to the jack adjacent to the cutter engaging the lever 167. The lever 167 cannot turn and become disengaged from the lug 170 because the cams 173 prevent such turning until the roller 172 reaches the position in which said roller is shown in broken lines in Fig. 36. The cams 173 swing the lever 167 out of engagement with the lug 170. Thus, swinging movement of the cutter 141 along with the blank being operated on is stopped.

The supporting member 164 is then swung back to its starting position by the lug 170 engaging the lever 174 in the position in which said lever is shown in dotted lines in Fig. 36, and swinging said lever to the position in which it is shown in solid lines in Fig. 36. Thus, the cutter 141 is returned to position for operating upon the next following blank.

In passing from the cam 55 along the cams 58 and 60 to the cam 62, the jack and the heel blank are turned through an angle slightly greater than 180°. In traveling along the cam 55, the roller 46 is at the outer side of said cam and the roller 46' is at the inner side. In leaving the cam 60, the roller 46 passes to the inner side of the cam 62 and the roller 46' to the outer side and is guided thereby until the roller 46 operates against the cam extension 65 and through the space 64 to the outer side of the cam 63 along which the roller 46' also operates. The jack is now in the position in which the breast wall 136 of the heel is toward the inside of the machine.

A carriage 179 is mounted for sliding movements along an arcuate support 180 (Figs. 1 and 44) and has pivoted thereon an outwardly extended arm 181 to which an elastic presser member 182 is attached. The arm 181 is attached to an inwardly extended arm 183 (Fig. 42) having thereon a roller 184 operating in a cam slot 185 formed in a curved plate 186. The cam slot 185 curves upwardly and downwardly so that, when the carriage 179 is moved along the rail 180, the lever 183 will be moved upwardly and downwardly, thereby moving the arm 181 upwardly and downwardly. The carriage 179 is moved to and yieldingly held in its unoperated or starting position by a spring 187 connecting said carriage with a stationary part 188 on which the plate 186 is supported. When the roller 184 moves to the high part of the cam slot 185, the arm 181 is moved downwardly and the presser member 182 is pressed downwardly against the wall 103 on the forwardly extended portion of the heel, as illustrated in Fig. 42. The carriage 179 supports a longitudinally movable bar 189 mounted radially with respect to the traveling carriage 10. The inner end of the bar 189 supports a roller 190 (Fig. 42) that operates in a cam slot 191, whereby said bar 189 is moved inwardly and outwardly as the carriage 179 moves laterally. In the starting or unoperated position of the carriage 179, the outer end of the bar 189 is in front of the jack shaft 36 and is engaged thereby. Consequently, as the jack continues to move, the carriage 179 is moved along with the jack and the cam slot 185 operates the arms 183 and 181 to press the presser member 182 downwardly against the heel wall 103. This occurs just before the cam 28 is turned to release the jack member 34 from the heel.
About the time that the presser member 182 is pressed downwardly against the heel wall 103 to hold the heel on the support 38, the cam 28 is turned to release the jack member 34 from the heel. This turning of the cam 28 is effected by engagement of one of the lugs 31 with a rigid arm 192 and engagement of another lug 31 with another rigid arm 193 (Fig. 40).

After the jack member 34 has been disengaged from the top end of the heel, said top end is cut off along the line 194 (Fig. 3) by a cutter or saw 195. The cutter or saw 195 is attached to the lower end of a shaft 196 journalled in a bearing 197. The bearing 197 is supported by a frame 198 mounted for sliding movements radially with respect to the carriage 10. The frame 198 is mounted on a support 199. A motor 200 is mounted on the frame 198 and has driving connection 201 with the shaft 196 for rotating said shaft and thereby the saw 195. The frame 198 is moved outwardly to its unoperated position by a spring 202 mounted on a rod 203 having its inner end attached to the frame 198 and its outer end provided with an abutment nut 204. The spring 202 is mounted on the rod 203 between the nut 204 and a part 205 of the support 199. The frame 198 is mounted on a pivot 206 supported by the member 1 and may be supported in different angles of inclination by an adjusting device consisting of a rod 207 having one end pivoted to the member 1 and the opposite end extending through an arm 208 attached to the support 199 and provided with supporting nuts 209. By screwing the nuts 209 along the rod 207, the angles of inclination of the support 199 may be varied as desired.

Figure 44:
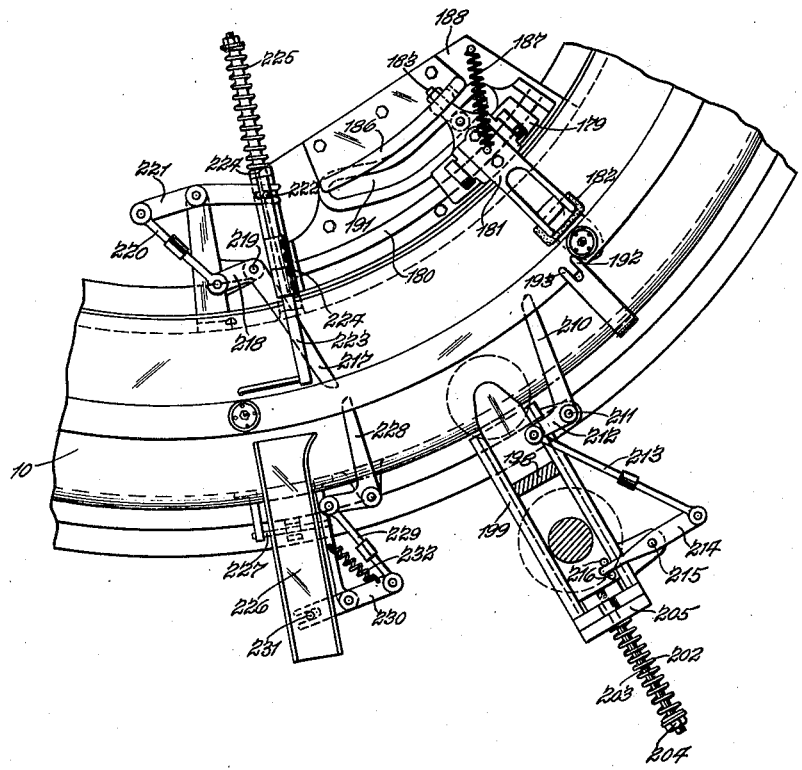
Fig. 44 is a plan view with parts in section of the mechanisms shown in Figs. 40 and 42.

An arm 210 of a bell crank lever extends inwardly into position to be engaged by the jack shaft 36 (Fig. 44). The bell crank lever is mounted on a pivot 211 and the other arm 212 of said bell crank lever is connected by a link 213 with the outer end of a lever 214. The lever 214 is on a pivot 215 and the inner end of said lever engages between parts 216 on the frame 198.

It is now clear that, during movement of the jack, the jack shaft 36 engages and operates the lever 210, thereby operating the lever 214 effectively to move the frame 198 inwardly so that the saw 195 will cut off the top end of the heel during the time that the heel is held upon the support 38 by the presser member 182. The jack shaft passes beyond and releases the lever 210, whereupon the spring 202 immediately operates to move the frame 198, and thereby the saw 195, outwardly from the heel. About this time, the roller 190 enters the inwardly curved portion of the cam 191 (Fig. 44) and withdraws the bar 189 from engagement with the jack shaft 36. The spring 187 immediately operates to return the carriage 179 to its starting or unoperated position for cooperation with the next approaching jack and heel.

Figure 45:
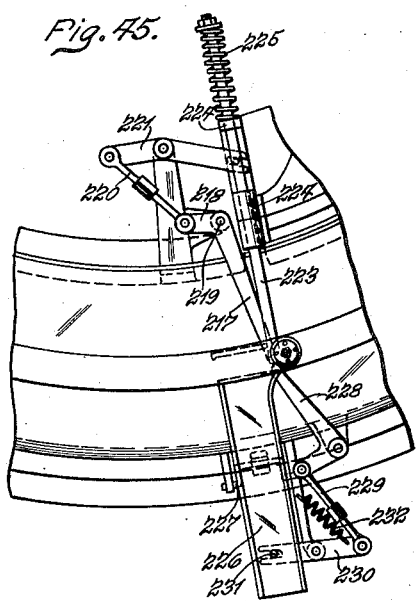
Fig. 45 is a plan view showing a part of the mechanism that is shown in Fig. 44 in a different operated position.
Figure 46:
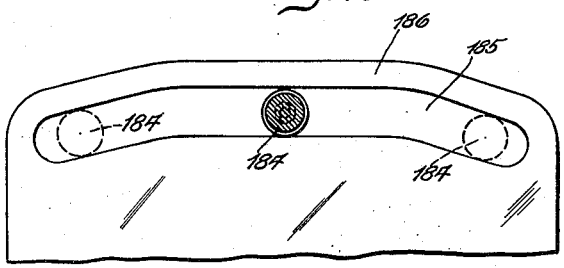
Fig. 46 is a sectional view on the line 46—46 of Fig. 42.

Next, the heel is released and discharged from the support 38. A bell crank lever comprising an outwardly extended arm 217 and a laterally extended arm 218 is mounted on a pivot 219 (Figs. 44 and 45). The outer end of the arm 217 is engaged and operated by the jack shaft 36 after the top end of the heel has been cut off, as described. The lever arm 218 is connected by a link 220 with one end of a lever 221 the opposite end of which has sliding pivotal connection 222 with a longitudinally movable ejector member 223. The ejector member 223 is mounted for radial sliding movements in supports 224 and is actuated inwardly by a spring 225.

When the jack shaft 36 engages and operates the lever 217, the lever 221 moves the ejector 223 outwardly and causes said ejector to push the heel out of engagement with and from the support 38 and into a discharge chute 226. The discharge chute 226 is pivoted on a crank 227 which is operated to swing the chute 226 inwardly and outwardly. A bell crank lever 228 has one arm extending inwardly in position to be engaged and operated by the jack shaft 36 and the opposite arm connected by a link 229 with but one end of a lever 230. The opposite end of the lever 230 has sliding pivotal connection 231 with the underside of the chute 226. A spring 232 connected with the lever 230 operates said lever to move the chute 226 outwardly. When the lever 228 is operated by the jack shaft, the chute 226 is moved inwardly in opposition to the spring 232.

The jack shaft then passes beyond and out of engagement with the levers 217 and 228, permitting the spring 225 to move the ejector 223 inwardly, and the spring 232 to move the chute 226 outwardly and to incline the chute 226, due to the raising thereof by the crank 227.

In passing from the saw 195 to the ejector device, the jack shaft 36 is turned one-half of a revolution by the roller 46 engaging the cam extension 48 (Fig. 9) and swinging the roller 46' inwardly and causing both rollers 46 and 46' to pass through the space 66 to the inner side of the cam 47. The jack is thereby positioned to receive another blank.

Figure 3:
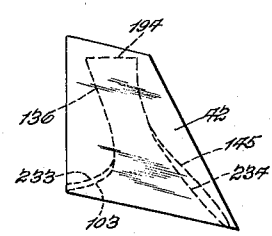
Fig. 3 is a view showing, in solid lines, a side of one of the blanks and, in dotted lines, two shapes of heels that may be made by this machine.

The full size blank 42 is shown in solid lines in Fig. 3 and different shapes of heels are indicated by dotted lines on the blank. In the adjustment of the cutter 96 shown in Fig. 24, it may be assumed that the walls 103 and 136 are formed. By raising the cutter as permitted by the slot 104 and the supporting screw 107, the blank may be cut to form a wall 233 and the wall 136. In the adjustment of the cutter 141 shown in Fig. 33, the blank 42 will form the wall 145 but, in varying the position of the cutter which is permitted by the construction 155 and 156 (Fig. 38) and the retaining device 158 (Fig. 33), the heel may be cut along different lines to form a wall 234, for instance, or different walls, as desired.

Also, the rail 163 may be supplemented by a cam rail 235 and the roller 162 mounted on said cam rail to swing the cutter 141 slightly about the pivots 148 during the time that the cutter is operating on the heel blank.

Figure 56:
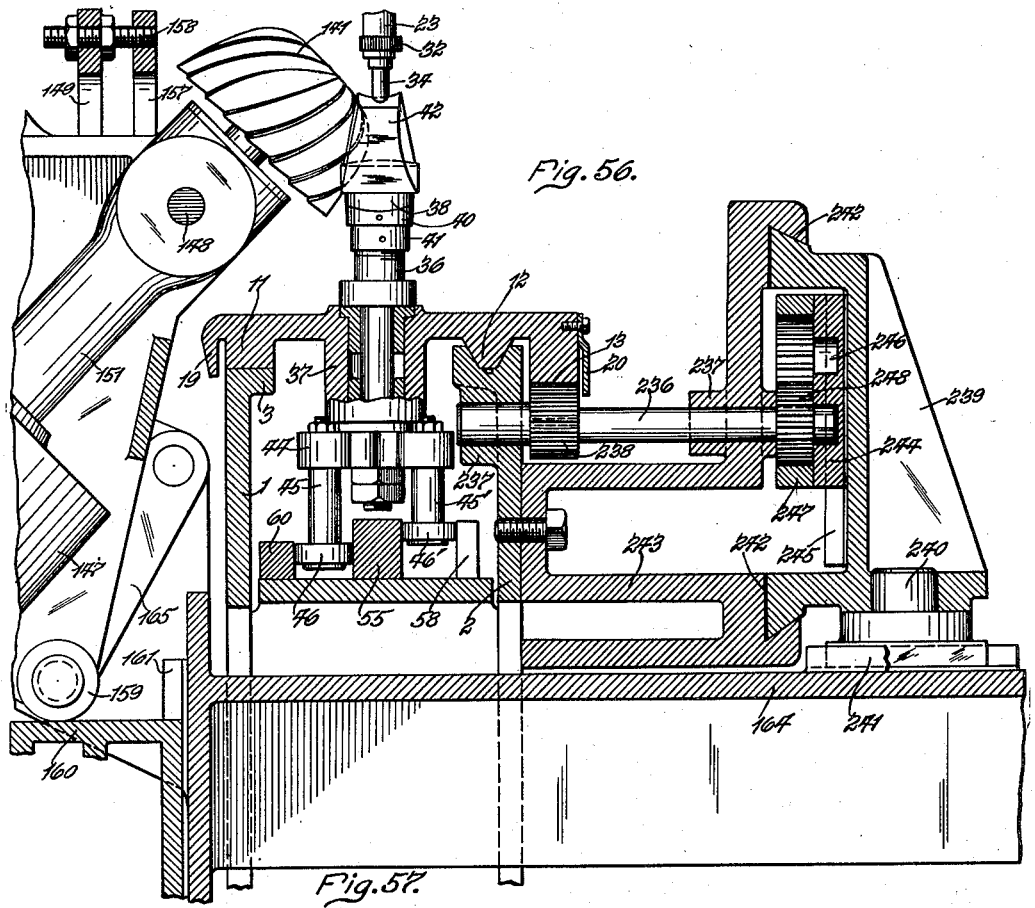
Fig. 56 is an enlarged sectional view on the line 56—56 of Fig. 52.
Figure 57:
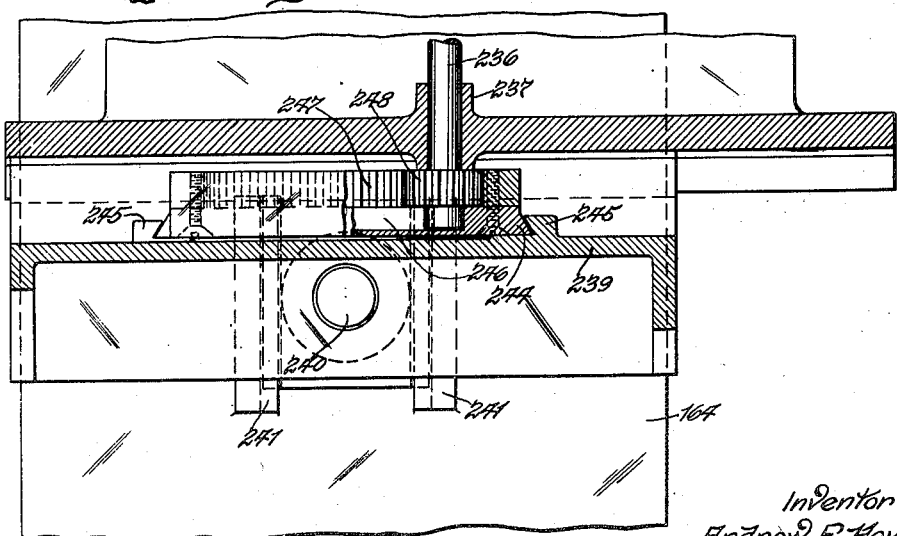
Fig. 57 is a detail view showing features of the cutter shifter mechanism.
Figure 62:
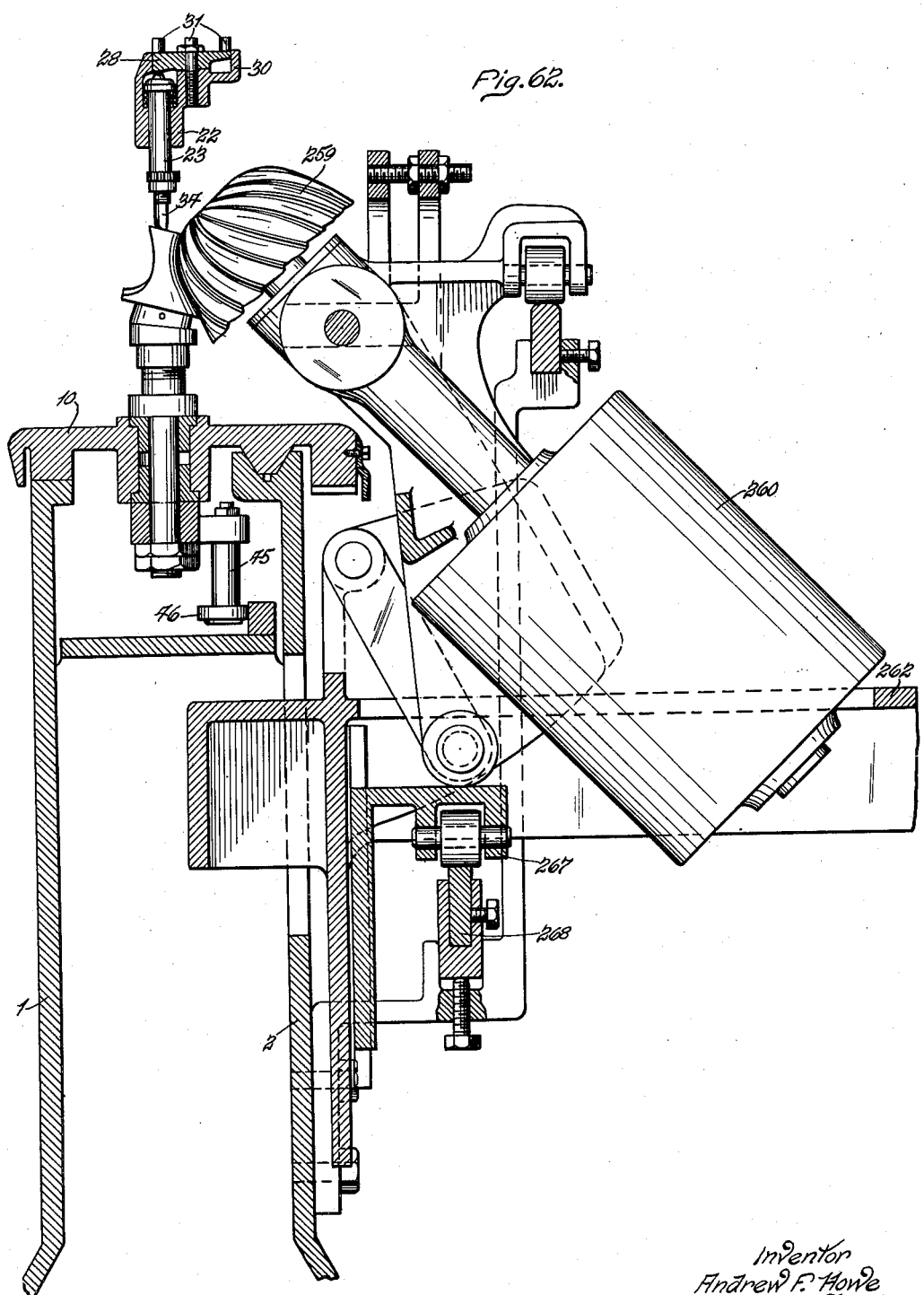
Fig. 62 is an enlarged sectional view showing the cutter that forms the final portion of the outer wall of the heel and the mounting therefor.

The support 164 may be oscillated by different forms of mechanism instead of utilizing the levers 167 and 174. An alternative form of mechanism for oscillating said support is illustrated in Figs. 51 to 57. As shown, a shaft 236 is journalled in fixed bearings 237 and has attached thereto a pinion 238 meshing with the rack 13. A frame 239 is mounted on a pivot 240 supported for radial sliding movements along the support 164 between guides 241. The frame has sliding joint connections 242 with a rigid member 243 that supports one of the bearings 237. A plate 244 is mounted for vertical sliding movements on the frame 239 between guides 245 and has in its outer face an approximately oval groove 246 into which the end of the shaft 236 extends (Fig. 56). An approximately oval internal rack 247 is rigid with the plate 244 and a pinion 248 rigid with the shaft 236 meshes with said rack. It is apparent that this gearing will swing the support 164 back and forth in the manner in which said support is swung back and forth by the levers 167 and 174 when said levers are operated by the lugs 170. The support 164 is swung in one direction as the pinion 248 rolls along the lower portion of the rack 247. When the end of the shaft 236 passes from the lower portion of the cam groove 246 to the upper portion, the plate 244 and rack 247 are moved downwardly and the pinion 248 then engages the upper portion of the rack 247 and swings the support 164 in the opposite direction. Thereby the cutter 141 has moved along with the jack and the blank mounted therein. Other forms of operating mechanism may be provided without departure from the principle of the invention.

The cutters are of novel construction. Each cutter is of appropriate form and shape to cut the walls desired to be formed. The cutter head 141, for instance, is a unitary body which, in its original form, is approximately hemispherical. In said body, spiral grooves 249 are formed to provide the spiral cutting edges 250. These cutting edges 250 cut smooth surfaces on the heel without tearing the wood or leaving projecting fibers. These cutters also discharge the wood particles and do not hold them as do cutters of certain other forms.

After the finished heel has been ejected from the jack, the rack 32, which is rigid with the sleeve 23, engages a rack 251 (Fig. 1) and is rotated until a flat surface 252 (Fig. 8) formed on rack 32 is turned toward said rack 251. When the flat surface 252 is toward the rack 251, rotation of the sleeve 23 and the jack member 34 is stopped and the jack member 34 is then in proper position for cooperation with the support 38 to engage and hold the heel blank 42 rigidly in the jack.

From the foregoing, it will be understood that, when the motor 17 is running, the carriage 10 is continuously rotated, moving the jacks successively to the loading mechanism, which is operated in the manner described to place a blank in each jack. The blanks are placed in the loading mechanism manually. After the blank has been clamped in each jack, the continuous movement of the carriage 10 presents the blank, first, to the cutter 92 (Fig. 22) which forms the arcuate wall 94 (Fig. 34). After leaving the cutter 92, the blank is next subjected to the operation of the cutter 96 which forms the walls 103 and 136. After leaving the cutter 96, the blank is subjected to the operation of the cutter 137 which removes a substantial portion of one of the rear corners of the heel blank preparatory for operation of the cutter 141 to form the finished wall 142. After leaving the cutter 137, the heel blank is subjected to the operation of the cutter 141, which is moved along with the heel blank during the time that the heel blank is turning in the direction of the arrows 145 (Fig. 34). After the wall 142 has been formed, the heel blank is carried along to the presser device 182 and is engaged and held thereby while the cam 28 is turned to release the jack member 34 from the blank. Then the heel blank is moved to the saw 195 which cuts the top end of the heel blank along the line 194 (Fig. 3). Then the presser member 182 is released from the wall 103 and the ejector device 223 is operated to push the heel from the support 38 onto the chute 226 and the chute 226 is operated to receive the heel and to discharge the heel therefrom.

The invention may be varied by providing two cutters for forming the outer wall of the heel instead of the single cutter 141. As shown (Fig. 58) a cutter 253 is mounted in a frame 254 supported on a swinging member 255. The support 255 is swung from and to a starting position by the system of levers that swing the support 164 from and to its starting position, and the same reference numerals are applied to the same parts. However, the support 255 is moved only about one-half the distance that the support 164 is moved, and the jack is operated to turn the blank through an angle of approximately 90° instead of approximately 180°. After leaving the cam 55, the rollers 46 and 46' operate against cams 60' and 58' to turn the jack, and thereby the blank, through an angle of approximately 90° while the cutter 253 is forming the portion 142' of the outer wall, which is approximately one-half of the outer wall. The cutter 253 cuts from the line X (Fig. 60) to the corner 143, after which the lug 170 passes from the lever 167 to the lever 174 and moves the support 255 to its starting position. The roller 46 passes through a space 256 separating the cam 60' from a cam 62' and the jack is thereby turned through an angle of approximately 90°. The roller 46' then operates against a cam 257 and the roller 46 operates against a cam 258, thereby turning the jack so that a cutter 259 will cut from the line X to the corner 144 in the direction of the arrows shown in Fig. 61.

The cutter 259 is operated by a motor 260. The motor 260 is mounted in a frame 261 on a swinging support 262 at the inner side of the annular carriage 10. The inner end of the support 262 is mounted on the pivot 8 like the supports 164 and 255. A lever 263 is the analogue of the lever 167 and is engaged at the proper time by a lug 170 to swing the support 262 along with the adjacent jack. A lever 264 is the analogue of the lever 174 and is supported on a pivot 265, and has its outer end in position to be engaged successively by the lugs 170 and operated thereby.

A link 266 connects the inner end of the lever 264 with the support 262 and functions as does the link 177 to swing the support 262 to its starting position after the remainder of the outer wall of the heel has been formed. The outer end of the support 262 is supported by one or more rollers 267 operating on a rail 268. The cutter 259 operates on the heel during the time that the jack is being turned through an angle of about 90° while the jack passes from the cam 62' and passes the cam 258. The extent of the swinging movements during the cutting operations by the cutters 253 and 259 is indicated by the radial lines and the notations "start of cut" and "end of cut" in Fig. 59.

Thus, one form of my invention comprises mechanism including a cutter for forming the entire outer wall 142 of the heel and, also, another form of the invention comprises the two cutters 253 and 259 for forming the outer wall of the heel. Obviously, the invention may be varied in other particulars.

It is now apparent that this machine is capable of continuous operation and that the various cutters and other devices perform their functions automatically and as an incident to the operation of their motors and the rotation of the carriage 10. The heel blanks are automatically placed in the jacks and the finished heels are automatically discharged therefrom after all cutting operations have been performed.

The machine may be varied widely without departure from the nature and principle of the invention.

I claim:—

1. A machine of the character described comprising a carriage supported for rotation about a vertical axis, a jack for holding a wood heel blank and supported by said carriage for rotation about a vertical axis, a cutter for forming the breast wall of the heel during rotation of said carriage, means for preventing said jack from rotating during the time that said cutter is forming said breast wall, a second cutter for forming the outer wall of the heel during rotation of said carriage and during rotation of said jack, and means for rotating said jack during operation of said second cutter and causing said second cutter to form the outer wall of the heel from one end of said breast wall to the other end thereof.

2. A machine of the character described comprising a carriage supported for rotation about a vertical axis, a jack for holding a wood heel blank and supported by said carriage for rotation about a vertical axis, mechanism for rotating said carriage, a cutter for forming the outer wall of the heel during rotation of said carriage and during rotation of said jack about said respective vertical axes, and means for rotating said jack during rotation of said carriage and causing said cutter to form the entire outer wall of the heel from one side of the front of the heel to the other side of the front of the heel.

3. A machine of the character described comprising a carriage supported for rotation about a vertical axis, a jack for holding a wood heel blank and supported by said carriage for rotation about a vertical axis, mechanism for rotating said carriage, a cutter for forming the outer wall of the heel during rotation of said carriage and during rotation of said jack about said respective vertical axes, means for rotating said jack during rotation of said carriage and causing said cutter to form the entire outer wall of the heel from one side of the front of the heel to the other side of the front of the heel, a device for cutting off the top end of the heel during rotation of said carriage, and mechanism for discharging the heel from said jack.

4. A machine of the character described comprising a carriage supported for rotation about a vertical axis, a jack for holding a wood heel blank and supported by said carriage for rotation about a vertical axis, a cutter for forming the entire outer wall of the heel during rotation of said carriage and during rotation of said jack, mechanism for moving said cutter along with the jack and the blank, and means for rotating said jack during operation of said cutter and causing said cutter to form the outer wall of the heel from one side of the front of the heel to the other side of the front thereof.

5. A machine of the character described comprising a rotary carriage, mechanism for rotating said carriage continuously about a vertical axis, a jack for holding a wood heel blank and supported by said carriage for rotation about a vertical axis, a cutter for forming the front end wall of the heel, a second cutter for forming the breast wall of the heel, a third cutter for forming the entire outer wall of the heel from one end of the breast wall to the other end thereof, and mechanism for turning said jack and the blank during operation of said last named cutter to cause the same to form the entire outer wall of the heel as aforesaid.

6. A machine of the character described comprising a carriage rotating continuously about a vertical axis, a jack for holding a wood heel blank and supported by said carriage for rotation about a vertical axis, a cutter for forming the outer wall of the heel from one side of the front of the heel to the other side of the front thereof, mechanism for turning said jack and the blank therein to cause said cutter to form the entire outer wall of the heel as aforesaid during movement of said carriage, and mechanism for moving said cutter from a starting position along with the jack during the time that said cutter is forming said outer wall.

7. A machine of the character described comprising a carriage rotating continuously about a vertical axis, a jack for holding a wood heel blank and supported by said carriage for rotation about a vertical axis, a cutter for forming the outer wall of the heel from one side of the front of the heel to the other side of the front thereof, mechanism for turning said jack and the blank therein to cause said cutter to form the entire outer wall of the heel as aforesaid during movement of said carriage, mechanism for moving said cutter from a starting position along with the jack during the time that said cutter is forming said outer wall, and mechanism operated by said carriage for moving said cutter to said starting position after said outer wall has been formed.

8. A machine of the character described comprising a jack for holding a wood heel blank, mechanism for moving said jack continuously along a circular line of movement, a cutter for forming on said blank the breast wall of the heel during said circular movement of said jack, a second cutter for forming the outer wall of the heel from one end of the breast wall to the opposite end thereof during said movement of said jack, and mechanism for rotating said jack about a vertical axis during operation of said second cutter, thereby causing said second cutter to form said outer wall as aforesaid.

9. A machine of the character described comprising a jack for holding a wood heel blank, mechanism for moving said jack continuously along a circular line of movement, a cutter for forming the entire outer wall of the heel from one side of the front of the heel to the opposite side thereof during movement of said jack along said circular line, and mechanism for rotating said jack about a vertical axis and thereby causing said cutter to form said outer wall as aforesaid during said circular and rotating movements of said jack.

10. A machine of the character described comprising a jack for holding a wood heel blank, mechanism for moving said jack continuously along a circular line of movement, a cutter for forming the entire outer wall of the heel from one side of the front of the heel to the opposite side thereof during movement of said jack along said circular line, mechanism for rotating said jack about a vertical axis and thereby causing said cutter to form said outer wall as aforesaid during said circular and rotating movements of said jack, and devices operated by said mechanism for moving said cutter laterally along with said jack during the time that said cutter is forming said outer wall.

11. A machine of the character described comprising a jack for holding a wood heel blank, mechanism for moving said jack continuously along a circular line of movement, a cutter for forming on said blank the breast wall of the heel and the under wall of a forward extension at the upper end of the heel during said circular movement of said jack, a second cutter for forming the entire outer wall of the heel from one side of the forward end of said forward extension to the opposite side thereof during said circular movement of said jack, and mechanism for moving said second cutter along with said jack during the entire time that said outer wall is being formed by said second cutter as aforesaid.

12. A machine of the character described comprising a jack for holding a wood heel blank, means for moving said jack continuously along a circular line of movement, a cutter for forming on said blank the breast wall of the heel and the under wall of a forward extension at the upper end of the heel during said circular movement of said jack, means for swinging said cutter along with said blank during the time that said cutter is forming said walls and for returning said cutter to its starting position after said walls have been formed thereby, a second cutter for forming the entire outer wall of the heel from one side of said forward extension to the opposite side thereof during said circular movement of said jack, and mechanism for turning said jack about a vertical axis during the time that said second cutter is forming said outer wall as aforesaid.

13. A machine of the character described comprising a jack for holding a wood heel blank, means for moving said jack continuously along a circular line of movement, a cutter for forming on said blank the breast wall of the heel and the under wall of a forward extension at the upper end of the heel during said circular movement of said jack, means for swinging said cutter along with said blank during the time that said cutter is forming said walls and for returning said cutter to its starting position after said walls have been formed thereby, a second cutter for forming the entire outer wall of the heel from one side of said forward extension to the opposite side thereof during said circular movement of said jack, mechanism for turning said jack about a vertical axis during the time that said second cutter is forming said outer wall as aforesaid, and mechanisms for moving said second cutter along with said jack during the time that said second cutter is forming said outer wall on said blank and for returning said second cutter to a starting position after said wall has been formed thereby.

14. A machine of the character described comprising a jack for holding a wood heel blank, mechanism for moving said jack continuously along a circular line of movement, a cutter for forming on said blank the breast wall of the heel during said circular movement of said jack, a second cutter for forming the outer wall of the heel from one end of the breast wall to the opposite end thereof during movement of said jack, mechanism for rotating said jack about a vertical axis during the time said second cutter is forming said outer wall as aforesaid, and devices operated by said last named mechanism for moving said second cutter along with said jack from a starting position during the time that said cutter is forming said outer wall as aforesaid and thereafter returning said second cutter to said starting position.

15. A machine of the character described comprising an annular series of vertical jacks for holding wood heel blanks, mechanism for moving said jacks continuously along a circular line around an axis equidistant from said jacks, a cutter for forming the entire outer heel wall on each blank during said continuous circular movement of said jacks, and mechanism for turning said jacks respectively about their vertical axes during the time that said cutter is forming said outer heel wall on the respective blanks.

16. A machine of the character described comprising an annular series of vertical jacks for holding wood heel blanks during the formation of an outer heel wall on each blank, mechanism for moving said jacks continuously along a circular line around an axis equidistant from said jacks, a cutter for forming the entire outer heel wall on each blank during said continuous circular movement of said jacks, a support for said cutter pivoted at said axis, and devices for moving said support and thereby said cutter along with the respective jacks during the time that the cutter is forming the outer heel wall on the respective blanks.

17. A machine of the character described comprising an annular series of vertical jacks for holding wood heel blanks during the formation of an outer heel wall on each blank, mechanism for moving said jacks continuously along a circular line around an axis equidistant from said jacks, a cutter for forming the entire outer heel wall on each blank during said continuous circular movement of said jacks, a support for said cutter pivoted at said axis, devices for moving said support and thereby said cutter along with the respective jacks during the time that the cutter is forming the outer heel wall on the respective blanks, and mechanism for turning said jacks respectively about their vertical axes during the time that said cutter is forming said outer heel wall on the respective blanks.

18. A machine of the character described comprising an annular series of vertical jacks for holding wood heel blanks, mechanism for moving said jacks continuously along a circular line around an axis equidistant from said jacks, a cutter supported for swinging movements about a horizontal axis, and mechanism for swinging said cutter about said axis and causing said cutter to form a curved wall on the underside of a forward extension at the upper end of the heel during said continuous circular movement of said jacks.

19. In a machine of the character described, mechanism for forming the breast walls on wood heels comprising a vertical jack for holding a wood heel blank on which the breast wall of the heel is to be formed, a cutter supported for swinging movements about a horizontal axis, mechanism for operating said cutter, mechanism for moving said jack horizontally adjacent to said cutter while said cutter operates on said blank, and devices for swinging said cutter about said horizontal axis during the time that said cutter is forming the breast wall of the heel on said blank.

20. A machine of the character described comprising an annular series of vertical jacks for holding wood heel blanks, mechanism for moving said jacks continuously and horizontally along a circular line around an axis equidistant from said jacks, a cutter supported for swinging movements about a horizontal axis for forming the breast walls of heels and curved walls on the underside of forward extensions at the upper ends of the heels during said continuous circular movement of said jacks, and mechanism for swinging said cutter about said horizontal axis approximately during the entire time that the cutter is operating on the blank.

21. A machine of the character described comprising an annular series of vertical jacks for holding wood heel blanks, mechanism for moving said jacks continuously and horizontally along a circular line around an axis equidistant from said jacks, a cutter supported for swinging movements about a horizontal axis for forming the breast walls of heels and curved walls on the underside of forward extensions at the upper ends of the heels during said continuous circular movement of said jacks, mechanism for swinging said cutter about said horizontal axis approximately during the entire time that the cutter is operating on the blank, a cutter for forming the entire outer wall of the heel, and mechanisms for operating said second cutter and said jacks in coordinated timed relationship to cause said second cutter to cut entirely around the outer surface of the heel blank from one side of the front end of said forward extension to the opposite side of the front end thereof.

22. A machine of the character described comprising a jack for holding a wood heel blank during the formation of the breast wall of the heel and a forward extension at the upper end of the heel, a cutter supported for swinging movements about an axis eccentric to a curved wall on the underside of said forward extension, means for operating said cutter, mechanism for moving said jack to present the blank to said cutter for simultaneous formation of said breast wall and said forward extension, and means for swinging said cutter about said axis to form simultaneously said breast wall and said curved wall on the underside of said forward extension.

23. A machine of the character described comprising a jack for holding a wood heel blank during the formation of the breast wall of the heel and a forward extension at the upper end of the heel, a cutter supported for swinging movements about an axis eccentric to a curved wall on the underside of said forward extension, means for operating said cutter, mechanism for moving said jack to present the blank to said cutter for formation of said breast wall and said forward extension, means for swinging said cutter about said axis to form said curved wall on the underside of said forward extension, and a cutter operating to cut entirely around the outer portion of said blank from one side of the front end of said forward extension to the opposite side of the front end thereof during movement of said jack adjacent to said last named cutter.

24. A machine of the character described comprising a jack for holding a wood heel blank during the formation of the breast wall of the heel and a forward extension at the upper end of the heel, a cutter supported for swinging movements about an axis eccentric to a curved wall on the underside of said forward extension, means for operating said cutter, mechanism for moving said jack to present the blank to said cutter for formation of said breast wall and said forward extension, means for swinging said cutter about said axis to form said curved wall on the underside of said forward extension, a cutter operating to cut entirely around the outer portion of said blank from one side of the front end of said forward extension to the opposite side of the front end thereof during movement of said jack adjacent to said last named cutter, and mechanism for moving said jack and said cutter relatively to require said cutter to cut entirely around said blank as aforesaid.

25. A machine of the character described comprising a circular carriage supported for horizontal rotary movements, a jack on said carriage for holding a wood heel blank during the formation of the breast wall of the heel and a forward extension at the upper end of the heel, a cutter supported for swinging movements about an axis eccentric to a curved wall on the underside of said forward extension, means for operating said cutter, and mechanism for moving said jack to present the blank to said cutter for simultaneous formation of said breast wall and said forward extension by said cutter during swinging movements of said cutter about said axis.

26. A machine of the character described comprising a circular carriage supported for horizontal rotary movements, a jack on said carriage for holding a wood heel blank during the formation of the breast wall of the heel and a forward extension at the upper end of the heel, a cutter supported for swinging movements about an axis eccentric to a curved wall on the underside of said forward extension, means for operating said cutter, mechanism for moving said jack to present the blank to said cutter for simultaneous formation of said breast wall and said forward extension by said cutter during swinging movements of said cutter about said axis, and means operated by said carriage for swinging said cutter about said axis from and to a starting position.

27. A machine of the character described comprising an annular series of vertical jacks, means for supporting and rotating said series of jacks about a vertical axis, means for holding wood heel blanks in said jacks respectively, a cutter operative to cut said blanks and form thereon simultaneously the breast walls of heels and forward extensions at the upper ends of said heels, and mechanism for swinging said cutter about an axis eccentric to curved walls on the undersides of said forward extensions respectively during the time that said cutter is operating on said blanks.

28. A machine of the character described comprising an annular series of vertical jacks, means for supporting and rotating said series of jacks about a vertical axis, means for holding wood heel blanks in said jacks respectively, a cutter operative to cut said blanks and form thereon the breast walls of heels and forward extensions at the upper ends of said heels, mechanism for swinging said cutter about an axis eccentric to curved walls on the undersides of said forward extensions respectively during the time that said cutter is operating on said blanks, an additional cutter, and mechanisms for coordinating the operations of said jacks and said additional cutter whereby said additional cutter will form the entire outer walls of heels on the respective blanks during continuous movement of said jacks.

29. A machine of the character described comprising an annular series of vertical jacks, means for supporting and rotating said series of jacks about a vertical axis, means for holding wood heel blanks in said jacks respectively, a cutter operative to cut said blanks and form thereon the breast walls of heels and forward extensions at the upper ends of said heels, mechanism for swinging said cutter about an axis eccentric to curved walls on the undersides of said forward extensions respectively during the time that said cutter is operating on said blanks, an additional cutter, mechanisms for coordinating the operations of said jacks and said additional cutter whereby said additional cutter will form the entire outer walls of heels on the respective blanks during continuous movement of said jacks, and means for moving said additional cutter along with said jacks respectively from a starting position and then returning said cutter to said starting position for operation on a succeeding blank.

30. A machine of the character described comprising an annular series of vertical jacks, means for supporting and rotating said series of jacks about a vertical axis, means for holding wood heel blanks in said jacks respectively, a cutter operative to cut said blanks and form thereon the breast walls of heels and forward extensions at the upper ends of said heels, mechanism for swinging said cutter about an axis eccentric to curved walls on the undersides of said forward extensions respectively during the time that said cutter is operating on said blanks, an additional cutter, mechanisms for coordinating the operations of said jacks and said additional cutter whereby said additional cutter will form the entire outer walls of heels on the respective blanks during continuous movement of said jacks, and a device for severing the top ends of the respective heels after said cutters have formed said walls on said heels.

31. A machine of the character described comprising an annular series of vertical jacks, means for supporting and rotating said series of jacks about a vertical axis, means for holding wood heel blanks in said jacks respectively, a cutter operative to cut said blanks and form thereon the breast walls of heels and forward extensions at the upper ends of said heels, mechanism for swinging said cutter about an axis eccentric to curved walls on the undersides of said forward extensions respectively during the time that said cutter is operating on said blanks, an additional cutter, mechanisms for coordinating the operations of said jacks and said additional cutter whereby said additional cutter will form the entire outer walls of heels on the respective blanks during continuous movement of said jacks, means for moving said additional cutter along with said jacks respectively from a starting position and then returning said cutter to said starting position for operation on a succeeding blank, and a device for severing the top ends of the respective heels after said cutters have formed said walls on said heels.

32. A machine of the character described comprising an annular series of vertical jacks, means for supporting and rotating said series of jacks about a vertical axis, means for holding wood heel blanks in said jacks respectively, a cutter operative to cut said blanks and form thereon the breast walls of heels and forward extensions at the upper ends of said heels, mechanism for swinging said cutter about an axis eccentric to curved walls on the undersides of said forward extensions respectively during the time that said cutter is operating on said blanks, an additional cutter, mechanisms for coordinating the operations of said jacks and said additional cutter whereby said additional cutter will form the entire outer walls of heels on the respective blanks during continuous movement of said jacks, and mechanisms for severing the top ends of the respective heels and for ejecting the heels from said jacks after said walls have been formed as aforesaid.

33. A machine of the character described comprising an annular series of vertical jacks, means for supporting and rotating said series of jacks about a vertical axis, means for holding wood heel blanks in said jacks respectively, a cutter operative to cut said blanks and form thereon the breast walls of heels and forward extensions at the upper ends of said heels, mechanism for swinging said cutter about an axis eccentric to curved walls on the undersides of said forward extensions respectively during the time that said cutter is operating on said blanks, an additional cutter, mechanisms for coordinating the operations of said jacks and said additional cutter whereby said additional cutter will form the entire outer walls of heels on the respective blanks during continuous movement of said jacks, means for moving said additional cutter along with said jacks respectively from a starting position and then returning said cutter to said starting position for operation on a succeeding blank, and mechanisms for severing the top ends of the respective heels and for ejecting the heels from said jacks after said walls have been formed as aforesaid.

34. A machine of the character described comprising a jack for holding a wood heel blank during the formation of the outer wall of the heel, mechanism for moving said jack continuously along a circular line of movement, a cutter supported for swinging movements from and to a starting position in an arc concentric with said circular line of movement of said jack, and mechanisms for moving said cutter along said arcuate line of movement in accompaniment of with said jack during continuous movement of said jack until the entire outer wall of the heel has been formed by said cutter.

35. A machine of the character described comprising a jack for holding a wood heel blank during the formation of the outer wall of the heel, mechanism for moving said jack continuously along a circular line of movement, a cutter supported for swinging movements from and to a starting position in an arc concentric with said circular line of movement of said jack, and mechanisms for moving said cutter along said arcuate line of movement in accompaniment with said jack during continuous movement of said jack until the entire outer wall of the heel has been formed by said cutter and then returning said cutter to a starting position preparatory for operation on another blank.

36. In a machine of the character described, a supporting jack member for supporting a wood heel blank, a clamping jack member for clamping the wood heel blank on said supporting jack member, a support for said clamping jack member, a cam mounted on said support for rotation about an axis parallel with said clamping jack member to operate said clamping jack member to clamping position, and devices for operating said cam about said axis to and from position to operate said clamping jack member.

37. In a machine of the character described, a movable carriage, a supporting jack member mounted on said carriage, a clamping jack member supported by said carriage for clamping a wood heel blank on said supporting jack member, a cam rotative about an axis parallel with said clamping jack member for moving said clamping jack member into clamping engagement with a blank on said supporting jack member and for holding said clamping jack member in clamping engagement with said blank, mechanism for moving said carriage, and a device for operating said cam about said axis to move said clamping jack member into clamping engagement with a blank on said supporting jack member.

38. In a machine of the character described, a movable carriage, a supporting jack member mounted on said carriage, a clamping jack member supported by said carriage for clamping a wood heel blank on said supporting jack member, mechanism for moving said carriage, a spring for supporting said clamping jack member out of clamping engagement with the blank on said supporting jack member, and a cam operative about an axis parallel with said clamping jack member to move said clamping jack member into clamping engagement with said blank in opposition to said spring.

39. In a machine of the character described, a supporting jack member for supporting a wood heel blank, a clamping jack member for clamping a wood heel blank on said supporting jack member, a support for said clamping jack member, a spring on said support for holding said clamping jack member out of position to clamp a blank on said supporting jack member, and a cam mounted in said support for rotation about an axis parallel with said clamping jack member to move said clamping jack member into clamping engagement with a blank on said supporting jack member in opposition to said spring.

40. In a machine of the character described, a supporting jack member for supporting a wood heel blank, a clamping jack member for clamping a wood heel blank on said supporting jack member, a support for said clamping jack member, a spring on said support for holding said clamping jack member out of position to clamp a blank on said supporting jack member, a cam mounted in said support for rotation about an axis parallel with said clamping jack member to move said clamping jack member into clamping engagement with a blank on said supporting jack member in opposition to said spring, mechanism for moving said jack members, and means for operating said cam during said movement.

41. In a machine of the character described, a jack device for engaging and holding a wood heel blank, mechanism for forming a heel from said blank, means for releasing said jack device from engagement with said blank, means for holding the blank in connection with the jack device, mechanism for cutting off the top end of the blank to form the finished heel, and means for discharging the blank from said jack device.

42. In a machine of the character described, a pair of jack members for clampingly engaging and holding between them a wood heel blank, mechanism for placing a wood heel blank between said members, mechanism for operating one of said members to position to clamp said blank between said members, mechanism for releasing said members from cooperative clamping engagement with said blank, a device for engaging and holding the blank upon one of said members when said members release said blank from clamping engagement, and mechanism for cutting off the top end of the heel during the time that the blank is engaged by said device.

43. In a machine of the character described, a pair of jack members for clampingly engaging and holding between them a wood heel blank, mechanism for placing a wood heel blank between said members, mechanism for operating one of said members to position to clamp said blank between said members, mechanism for releasing said members from cooperative clamping engagement with said blank, a device for engaging and holding the blank upon one of said members when said members release said blank from clamping engagement, mechanism for cutting off the top end of the heel during the time that the blank is engaged by said device, means for releasing said device from the heel after the top end of the heel has been cut off as aforesaid, and means for discharging the blank from the jack.

44. In a machine of the character described, a continuously moving jack for holding a wood heel blank having a heel breast wall, a swinging support, a cutter mounted on said support for operating on the blank during movement of the jack and the blank adjacent to said cutter, mechanism for moving the cutter along with the jack and the blank during operation of the cutter on the blank, and mechanism for turning the jack and the blank during such movement and causing the cutter to cut entirely around the blank from one side of the breast wall to the other side thereof.

45. In a machine of the character described, a continuously moving jack for holding a wood heel blank having a heel breast wall, a support movable from and to a starting position, a cutter mounted on said support for operating on the blank during movement of the jack and the blank adjacent to said cutter, mechanism for moving the cutter from said starting position along with the jack and the blank during operation of the cutter on the blank, mechanism for turning the jack and the blank during such movement and causing the cutter to cut entirely around the blank from one side of the breast wall to the other side thereof, and means for returning the support and the cutter to said starting position.

46. In a machine of the character described, a continuously moving support, a jack device carried by said support for holding a wood heel blank, cutters for forming on said blank the breast wall and the outer wall of a heel during movement of said support, means for releasing the jack from holding engagement with the blank, an element operated by said support for engaging and holding the blank on a part of the jack, a device for cutting off the top end of the blank while the blank is held by said element, and means for releasing said element from the blank.

47. In a machine of the character described, a continuously moving support, a jack device carried by said support for holding a wood heel blank, cutters for forming on said blank the breast wall and the outer wall of a heel during movement of said support, means for releasing the jack from holding engagement with the blank, an element operated by said support for engaging and holding the blank on a part of the jack, a device for cutting off the top end of the blank while the blank is held by said element, means for releasing said element from the blank, and mechanism operated by said support for discharging the heel from the jack and for conveying the heel from the machine.

48. In a machine of the character described, a continuously moving support, a jack mounted on said support for holding a wood heel blank, a cutter pivoted for swinging movements and operative to cut said blank and simultaneously form the breast wall of the heel and a curved wall on a forward extension at the upper end of the heel, and mechanism operated by said support for swinging said cutter on its pivot to form said curved wall.

49. In a machine of the character described, a support, mechanism for rotating said support continuously about a vertical axis, a jack mounted on said support for holding a wood heel blank having a heel breast wall, a cutter, means supporting said cutter for movement from a starting position along with said jack and for returning said cutter to said starting position, devices operated by said support for moving said cutter from and to said starting position, and means for turning said jack and thereby said blank during operation of the cutter on the blank from position in which the cutter first engages the blank at one side of the breast wall to position in which the cutter leaves the blank at the opposite side of the breast wall, thereby forming the entire outer wall of the heel.

50. In a machine of the character described, a support, mechanism for rotating said support continuously about a vertical axis, a jack mounted on said support for holding a wood heel blank having a heel breast wall, a cutter, means supporting said cutter for movement from a starting position along with said jack and for returning said cutter to said starting position, devices operated by said support for moving said cutter from and to said starting position, means for turning said jack and thereby said blank during operation of the cutter on the blank from position in which the cutter first engages the blank at one side of the breast wall to position in which the cutter leaves the blank at the opposite side of the breast wall, thereby forming the entire outer wall of the heel, and mechanisms controlled by said support for cutting off the top end of the heel blank to form the finished heel and subsequently discharging the heel from the jack.

51. In a machine of the character described, an annular carriage, mechanism for rotating said carriage continuously in one direction about a vertical axis, a jack device on said carriage for holding a wood heel blank, cutters supported at opposite sides of said carriage for forming the outer wall of a heel on the blank carried by said jack device, mechanism for rotating the jack device, and thereby the blank, during operation of the cutters on the blank, and means for moving said cutters along with the blank during the cutting operation.

ANDREW F. HOWE.